US009009726B2

(12) United States Patent
Burckhardt et al.

(10) Patent No.: US 9,009,726 B2
(45) Date of Patent: Apr. 14, 2015

(54) DETERMINISTIC SHARING OF DATA AMONG CONCURRENT TASKS USING PRE-DEFINED DETERMINISTIC CONFLICT RESOLUTION POLICIES

(75) Inventors: Sebastian Burckhardt, Sammamish, WA (US); Daniel Johannes Pieter Leijen, Bellevue, CA (US); Alexandro Baldassin, Santa Barbara D'Oeste (BR)

(73) Assignee: Microsoft Technology Licensing, LLC, Redmond, WA (US)

( * ) Notice: Subject to any disclaimer, the term of this patent is extended or adjusted under 35 U.S.C. 154(b) by 422 days.

(21) Appl. No.: 12/965,070

(22) Filed: Dec. 10, 2010

(65) Prior Publication Data

US 2012/0151495 A1    Jun. 14, 2012

(51) Int. Cl.
| | |
|---|---|
| G06F 9/46 | (2006.01) |
| G06F 9/54 | (2006.01) |
| G06F 17/30 | (2006.01) |
| G06F 9/48 | (2006.01) |

(52) U.S. Cl.
CPC .......... *G06F 9/544* (2013.01); *G06F 17/30168* (2013.01); *G06F 9/466* (2013.01); *G06F 9/485* (2013.01)

(58) Field of Classification Search
CPC ....... G06F 9/544; G06F 9/485; G06F 9/3818; G06F 9/466; G06F 9/3804; G06F 2009/38; G06F 2009/4843; G06F 8/314
USPC ............ 718/106, 107; 707/E17.007; 717/149
See application file for complete search history.

(56) References Cited

U.S. PATENT DOCUMENTS

| | | | |
|---|---|---|---|
| 5,581,753 A | | 12/1996 | Terry et al. |
| 5,603,026 A | * | 2/1997 | Demers et al. .................. 1/1 |
| 5,857,182 A | * | 1/1999 | DeMichiel et al. ............. 1/1 |
| 6,240,414 B1 | * | 5/2001 | Beizer et al. .................. 1/1 |
| 7,136,903 B1 | | 11/2006 | Phillips et al. |
| 7,254,597 B2 | | 8/2007 | Moir et al. |

(Continued)

OTHER PUBLICATIONS

Leiserson, Charles E., "The Cilk++ Concurrency Platform", Proceedings of the 46th Annual Design Automation Conference, Jul. 26-31, 2009, pp. 522-527.

(Continued)

*Primary Examiner* — Meng An
*Assistant Examiner* — Abu Ghaffari
(74) *Attorney, Agent, or Firm* — Steve Wight; Judy Yee; Micky Minhas

(57) ABSTRACT

A "Concurrent Sharing Model" provides a programming model based on revisions and isolation types for concurrent revisions of states, data, or variables shared between two or more concurrent tasks or programs. This model enables revisions of shared states, data, or variables to maintain determinacy despite nondeterministic scheduling between concurrent tasks or programs. More specifically, the Concurrent Sharing Model provides various techniques wherein shared states, data, or variables are conceptually replicated on forks, and only copied or written if necessary, then deterministically merged on joins such that concurrent tasks or programs can work with independent local copies of the shared states, data, or variables while ensuring automated conflict resolution. This model is applicable to a wide variety of system architectures, including applications that execute tasks on a CPU or GPU, applications that run, in full or in part, on multi-core processors without full shared-memory guarantees, and applications that run within cloud computing environments.

20 Claims, 10 Drawing Sheets

(56) References Cited

U.S. PATENT DOCUMENTS

| | | | |
|---|---|---|---|
| 7,349,913 B2 | 3/2008 | Clark et al. | |
| 7,512,638 B2 * | 3/2009 | Jhaveri et al. | 1/1 |
| 7,529,780 B1 * | 5/2009 | Braginsky et al. | 1/1 |
| 7,593,943 B2 * | 9/2009 | Clarke et al. | 1/1 |
| 7,822,711 B1 | 10/2010 | Ranade | |
| 7,950,012 B2 * | 5/2011 | Tirumalai et al. | 718/102 |
| 7,979,844 B2 * | 7/2011 | Srinivasan | 717/119 |
| 8,195,858 B1 * | 6/2012 | Keil et al. | 710/117 |
| 8,489,549 B2 | 7/2013 | Guarraci | |
| 8,539,486 B2 * | 9/2013 | Cain et al. | 718/100 |
| 2003/0149709 A1 | 8/2003 | Banks | |
| 2007/0180075 A1 | 8/2007 | Chasman et al. | |
| 2008/0077628 A1 | 3/2008 | Gonzalez et al. | |
| 2009/0125882 A1 * | 5/2009 | Frigo et al. | 717/116 |
| 2010/0083266 A1 * | 4/2010 | Dai et al. | 718/103 |
| 2010/0162247 A1 * | 6/2010 | Welc et al. | 718/101 |
| 2011/0153566 A1 * | 6/2011 | Larson et al. | 707/638 |
| 2012/0096474 A1 * | 4/2012 | Jiao | 718/107 |

OTHER PUBLICATIONS

Sen, Siddhartha., "Dynamic Processor Allocation for Adaptively Parallel Work-Stealing Jobs", Department of Electrical Engineering and Computer Science, Sep. 10, 2004, pp. 82.

Leiserson, Charles E., "Multithreaded Programming in Cilk", ACM Supercomputing Workshop on Manycore and Multicore Computing, Nov. 11, 2007, pp. 37.

Lea, Doug., "A Java Fork/Join Framework", Proceedings of the ACM 2000 conference on Java Grande, Jun. 3-4, 2000, pp. 8.

Mahajan, et al., "ASTRO: Autonomous and Trustworthy Data Sharing", Department of Computer Sciences (TR-08-24), Oct. 2008, pp. 15.

Aditya, et al., "Semantics of PH: A Parallel Dialect of Haskell", In Proceedings From the Haskell Workshop at FPCA, Publisher: Citeseer, Jun. 7, 1995, pp. 22.

Allen, et al., "Project Fortress: A Multicore Language for Multicore Processors", Sep. 2007, pp. 38-43.

Berenson, et al., "A Critique of ANSI SQL Isolation Levels", Joint ACM SIGMOD Intl Conference on Management of Data and ACM SIGACT-SIGMOD-SIGART Symposium on Principles of Database Systems, May 22-25, 1995, pp. 10.

Bergan, et al., "Coredet: A Compiler and Runtime System for Deterministic Multithreaded Execution", Proceedings of the fifteenth edition of ASPLOS on Architectural support for programming languages and operating systems, Mar. 13-17, 2010, pp. 12.

Berger, et al., "Grace: Safe Multithreaded Programming for C/C++", Proceeding of the 24th ACM SIGPLAN conference on Object oriented programming systems languages and applications, Oct. 25-29, 2009, pp. 16.

Blelloch, et al., "Implementation of a Portable Nested Data-parallel Language", Proceedings of the fourth ACM SIGPLAN symposium on Principles and practice of parallel programming, May 19-22, 1993, pp. 31.

Blundell, et al., "Deconstructing Transactions: The Subtleties of Atomicity", Appears in the Annual Workshop on Duplicating, Deconstructing, and Debunking (WDDD), Jun. 2005, pp. 1-7.

Bocchino Jr., et al., "A Type and Effect System for Deterministic Parallel Java", Proceeding of the 24th ACM SIGPLAN conference on Object oriented programming systems languages and applications, Oct. 25-29, 2009, pp. 20.

Danaher, et al., "The Jcilk Language for Multithreaded Computing", Synchronization and Concurrency in Object-Oriented Languages, Oct. 2005, pp. 8.

Devietti, et al., "DMP: Deterministic Shared-memory Multiprocessing", Proceeding of the 14th international conference on Architectural support for programming languages and operating systems, Mar. 7-11, 2009, pp. 12.

Flanagan, et al., "The Semantics of Future and its Use in Program Optimization", Proceedings of the 22nd ACM SIGPLAN-SIGACT symposium on Principles of programming languages, Jan. 23-25, 1995, pp. 12.

Frigo, et al., "Reducers and Other Cilk++ Hyperobjects", Proceedings of the twenty-first annual symposium on Parallelism in algorithms and architectures, Aug. 11-13, 2009, pp. 12.

Frigo, et al., "The Implementation of the Cilk-5 Multithreaded Language", Proceedings of the ACM SIGPLAN 1998 conference on Programming language design and implementation, Jun. 17-19, 1998, pp. 1-12.

Harris, et al., "Transactional Memory: An Overview", IEEE Micro, vol. 27, No. 3, May-Jun. 2007, pp. 22.

Weller, et al., "Beginning .NET Game Programming in C#", 2004, pp. 28.

Herlihy, et al., "Transactional Boosting: A Methodology for Highly Concurrent Transactional Objects", Proceedings of the 13th ACM SIGPLAN Symposium on Principles and practice of parallel programming, Feb. 20-23, 2008, pp. 9.

Herlihy, et al., "Linearizability: A Correctness Condition for Concurrent Objects" ACM Transactions on Programming Languages and Systems, vol. 12 Issue 3, Jul. 1990, pp. 463-492.

Koskinen, et al., "Coarse-grained Transactions", ACM SIGPLAN Notices—POPL, vol. 45, No. 1, Jan. 17-23, 2010, pp. 12.

Kulkarni, et al., "Optimistic Parallelism Requires Abstractions", Proceedings of the 2007 ACM SIGPLAN conference on Programming language design and implementation, Jun. 11-13, 2007, pp. 12.

Lee, et al., "Respec: efficient online multiprocessor replay via speculation and external determinism", Proceedings of the fifteenth edition of ASPLOS on Architectural support for programming languages and operating systems, Mar. 13-17, 2010, pp. 13.

Lee, et al., "Featherweight X10: A Core Calculus for Async-finish Parallelism", Proceedings of the 15th ACM SIGPLAN symposium on Principles and practice of parallel programming, Jan. 9-14, 2010, pp. 23.

Leijen, et al., "The Design of a Task Parallel Library", Proceeding of the 24th ACM SIGPLAN conference on Object oriented programming systems languages and applications, Oct. 25-29, 2009, pp. 227-241.

Abadi, et al., "Semantics of Transactional Memory and Automatic Mutual Exclusion", Proceedings of the 35th annual ACM SIGPLAN-SIGACT symposium on Principles of programming languages, Jan. 7-12, 2008, pp. 12.

"Microsoft. Parallel extensions to .NET", p. 1.

Moreau, Luc, "The Semantics of Scheme with Future", Technical Report M95/7, Proceedings of the first ACM SIGPLAN International Conference on Functional Programming, May 24-26, 1996, pp. 1-57.

Bernstein, et al., "Multiversion Concurrency Control—Theory and Algorithms", ACM Transactions on Database Systems, vol. 8, No. 4, Dec. 1983, pp. 465-483.

Bernstein, et al., "Concurrency Control and Recovery in Database Systems", Addison-Wesley, 1987, pp. 377.

Pratikakis, et al., "Transparent Proxies for Java Futures", Proceedings of the 19th annual ACM SIGPLAN conference on Object-oriented programming, systems, languages, and applications, Oct. 24-28, 2004, pp. 1-50.

Randall, Keith H., "Cilk: Efficient Multithreaded Computing", Technical Report, Jun. 1998, pp. 179.

Riegel, et al., "Snapshot Isolation for Software Transactional Memory", In: Proceedings of the First ACM SIGPLAN Workshop on Languages, Compilers, and Hardware Support for Transactional Computing, 2006, pp. 10.

Rinard, et al., "Eliminating Synchronization Bottlenecks in Object-based Programs using Adaptive Replication", International Conference on Supercomputing, 1999, pp. 83-92.

Steele, Guy., "Parallel Programming and Parallel Abstractions in Fortress", Sun Micro systems Laboratories, Oct. 2006, pp. 57.

Welc, et al., "Safe Futures for Java", Proceedings of the 20th annual ACM SIGPLAN conference on Object-oriented programming, systems, languages, and applications, Oct. 16-20, 2005, pp. 439-453.

Welc, et al., "Irrevocable Transactions and their Applications", Proceedings of the twentieth annual symposium on Parallelism in algorithms and architectures, Jun. 14-16, 2008, pp. 285-296.

Denning, et al., "The Resurgence of Parallelism", Communications of the ACM, vol. 53, No. 6, Jun. 2010, pp. 3.

Fekete, et al., "Making Snapshot Isolation Serializable", ACM Transactions on Database Systems, vol. 30, No. 2, Jun. 2005, pp. 492-528.

(56) References Cited

OTHER PUBLICATIONS

Lamport, Leslie., "How to Make a Multiprocessor Computer that Correctly Executes Multiprocess Programs", IEEE Transactions on Computers, vol. c-28, No. 9, Sep. 1979, pp. 690-691.

"Confluent Reductions: Abstract Properties and Applications in Term Rewriting Systems", 18th Annual Symposium on Foundations of Computer Science, Oct. 31, 1977-Nov. 2, 1977, pp. 30-45.

Saraswat, et al., "X10: concurrent programming for modern architectures", Proceedings of the 12th ACM SIGPLAN symposium on Principles and practice of parallel programming, Mar. 14-17, 2007, p. 271.

Almeida, P. S., C. Baquero, V. Fonte, Version stamps—Decentralized version vectors, 22nd Int'l Conf. on Distributed Computing Systems, Jul. 2-5, 2002, pp. 544-551.

Chen, P. P.-S., The entity-relationship model—Toward a unified view of data, ACM Transactions on Database Systems, Mar. 1976, vol. 1, No. 1, pp. 9-36.

Decandia, G., D. Hastorun, M. Jampani, G. Kakulapati, A. Lakshman, A. Pilchin, S. Sivasubramanian, P. Vosshall, W. Vogels, Dynamo: Amazon's highly available key-value store, Symposium on Operating Systems Principles, SOSP 2007, Oct. 14-17, 2007, pp. 205-220, Stevenson, Washington USA.

Gray, J., P. Helland, P. O'Neil, D. Shasha, The dangers of replication and a solution, Proc. of the 1996 ACM SIGMOD Int'l Conf. on Management of Data, SIGMOD 1996, Jan. 1996, pp. 173-182, Montreal Canada.

Imine, A., M. Rusinovvitch, G. Oster, P. Molli, Formal design and verification of operational transformation algorithms for copies convergence, Theoretical Computer Science, Feb. 2006, vol. 351, No. 2, pp. 167-183.

Kaplan, H., Persistent data structures, Handbook on Data Structures and Applications, pp. 1-27, 2001, CRC Press.

Petersen, K., M. J. Spreitzer, D. B. Terry, M. M. Theimer, A. J. Demers, Flexible update propagation for weakly consistent replication, Proc. of the Sixteenth ACM Symposium on Operating System Principles, SOSP 1997, Oct. 5-8, 1997, pp. 288-301, St. Malo, France.

Saito, Y., M. Shapiro, Optimistic replication, ACM Computing Surveys, vol. 37, No. 1, Mar. 2005, pp. 42-81.

Shapiro, M., B. Kemme, Eventual consistency, Encyclopedia of Database Systems, Sep. 2009, pp. 1071-1072, Springer.

Sun, C., C. Ellis, Operational transformation in real-time group editors: Issues, algorithms, and achievements, Proceedings of the ACM 1998 Conference on Computer Supported Cooperative Work, CSCW 1998, Nov. 1998, pp. 59-68, Seattle, Washington, USA.

Terry, D. B., M. M. Theimer, K. Petersen, A. J. Demers, M. J. Spreitzer, C. H. Hauser, Managing update conflicts in Bayou, a weakly connected replicated storage system, ACM SIGOPS Operating Systems Review, Dec. 1995, vol. 29, No. 5, pp. 172-183.

Tillmann, N., M. Moskal, J. de Halleux, M. Fähndrich, TouchDevelop: Programming cloud-connected mobile devices via touchscreen, Microsoft TechReport MSR-TR-2011-49, Aug. 17, 2011, pp. 1-21.

Yip, A., B. Chen, R. Morris, Pastwatch: A distributed version control system, 3rd Symposium on Networked Systems Design & Implementation, NSDI 2006, May 2007, pp. 381-394.

Ghaffari, A., U.S. Office Action, U.S. Appl. No. 13/530,661, Nov. 6, 2014, pp. 1-15.

* cited by examiner

Examples of Various Revision Diagrams
Illustrating Semantics of a Versioned Integer Variable Examples of Various Revision Diagrams
Illustrating Semantics of a Cumulative Integer Variable

*Examples of Revision Diagrams that Illustrate the Difference between Versioning Two Separate Integer Variables (on the Left) and Versioning a Pair of Integer Variables (on the Right)*

*Exemplary Small Program and Corresponding Revision Diagram (See FIG. 11 for an Illustration of Relationships between Segments)*

Relationships between Segments Illustrated in FIG. 10

DETERMINISTIC SHARING OF DATA AMONG CONCURRENT TASKS USING PRE-DEFINED DETERMINISTIC CONFLICT RESOLUTION POLICIES

BACKGROUND

1. Technical Field

A "Concurrent Sharing Model" provides a fork-join model of concurrency wherein shared states, data, or variables are conceptually replicated on forks, and only copied or written if necessary, then deterministically merged on joins such that concurrent tasks or programs can work with independent local copies of the shared states, data, or variables in a manner that ensures automated conflict resolution.

2. Related Art

Despite significant research on parallel programming, how to effectively build applications that enable concurrent execution of tasks that perform various functions and may execute asynchronously is not generally well understood. The issue of concurrency is important in practice since a wide range of applications need to be responsive and would benefit from exploiting parallel hardware.

For example, a typical word processing application, where many tasks are executing in parallel, may concurrently run tasks that: (1) save a snapshot of a document to disk, (2) react to keyboard input by a user who is editing the document, (3) perform a spell-check in the background, and (4) exchange document updates with one or more collaborating remote users. Some of these tasks are CPU-bound, others are IO-bound; some only read the shared data, while other tasks may modify the shared data. However, all of the concurrent tasks may potentially access the same data at the same time; thus, these tasks must avoid, negotiate, or any potential read and/or write resolve conflicts.

There has been a significant amount prior work on programming models for concurrency. Recently, many researchers have proposed programming models for deterministic concurrency, creating renewed interest in an old problem previously known as determinacy. These models generally guarantee that the execution is equivalent to some sequential execution, and cannot easily resolve all conflicts on commit. Thus, these types of conventional models operate by restricting tasks from producing such conflicts either statically (by type system) or dynamically (pessimistic with blocking, or optimistic with abort and retry).

The conventional concept of transactional boosting provides coarse-grained transactions, and semantic commutativity, which eliminate false conflicts by raising the abstraction level. Unfortunately, while transactional boosting avoids false conflicts, it is not capable of resolving true conflicts deterministically (in a not necessarily serializable way).

As is well known to those skilled in the art, traditional "locking" schemes are appropriate for safely sharing data between tasks. However, locking complicates the code because it requires programmers to think about the placement of critical sections, which involves nontrivial tradeoffs and complicates code maintenance. Moreover, locking alone does not always suffice. For example, consider a game application which executes concurrently (1) a physics task which updates the position of all game objects based on their speed and the time elapsed, and (2) a render task which draws all objects onto the screen. Then, any solution based solely on locks would either hamper concurrency (too coarse) or provide insufficient isolation (too fine), as some of the objects may be rendered at the future position, while others are rendered at the current position.

For this reason, replication is often a necessary ingredient to achieve parallelization of application tasks. Games, for example, may maintain two copies of the shared state (using so-called double-buffering) to guarantee isolation of tasks while enabling any number of read-only tasks to execute concurrently with a single writer task. However, this pattern is somewhat specific to the synchronization structure of games, and maintaining just two buffers is not always enough (for example, there may be multiple concurrent modifications, or snapshots may need to persist for more than a single frame). Moreover, performing a full replication of the shared state is not the most space-efficient solution.

Another common replication-based solution is to use immutable objects to encode shared states. Any tasks that wish to modify an immutable object must instead create a copy. This pattern can efficiently guarantee isolation and enables concurrency. However, it can introduce new challenges, such as how to resolve conflicting updates, or how to bound space requirements in situations where frequent modifications to the data may cause excessive copying.

Conventional "transactions" or "transactional memory" are used in an attempt to address the problem of handling concurrent access to shared data. However, transactions (whether optimistic or pessimistic) handle conflicts non-deterministically. Conventionally, it has long been recognized that providing strong guarantees such as serializability or linearizability can be overly conservative for some applications. Consequently, users of "transactions" have proposed alternate guarantees such as "multi-version concurrency control" or "snapshot isolation" (SI). SI transactions operate on stable snapshots and do not guarantee serializability. Unfortunately, they are restricted by being unable to perform deterministic conflict resolution (but rather abort transactions in schedule-dependent and thus nondeterministic ways) and do not support general nesting of transactions. Further, optimistic transactions do not fare well in the presence of conflicts that cause excessive rollback and retry. Moreover, combining optimistic transactions with I/O can be done only under some restrictions because the latter cannot always be rolled back.

Recently, researchers have proposed programming models for deterministic concurrency. However, these models are quite restrictive in that because they guarantee task execution is equivalent to some sequential execution, they cannot easily resolve all conflicts on commit, and must therefore restrict tasks from producing such conflicts either statically (by type system) or dynamically (pessimistic with blocking, or optimistic with abort and retry). Also, some of these models allow only a restricted "fork-join" form of concurrency. Hardware architects have also proposed supporting deterministic execution. However, these mechanisms guarantee determinism only, not isolation.

Cilk++ is a general-purpose programming language designed for multithreaded parallel computing. Cilk++ hyperobjects are primitives that use type declarations by the programmer to change the semantics of shared variables. Cilk++ hyperobjects may split, hold, and reduce values. However, these primitives do not provide seamless semantics that ensure determinacy on joins. In particular, the determinacy guarantees are fragile, i.e., they do not hold for all programs.

Some languages statically restrict the use of joins, to make stronger scheduling guarantees (as done in Cilk++) or to simplify the most common usage patterns and to eliminate common user mistakes (as done in X10). In fact, many models use a restricted "fork-join" parallelism. Unfortunately, such restrictions (while reasonable for data-parallel problems) can make it difficult to write applications that adapt to external non-determinism or to unpredictable latencies.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In general, a "Concurrent Sharing Model," as described herein, provides various embodiments of a programming model based on "revisions" and "isolation types" for concurrent revisions of states, data, or variables shared between two or more concurrent tasks (i.e., tasks, variables, applications, programs, etc.). This model enables revisions of shared states, data, or variables to maintain determinacy despite nondeterministic scheduling between concurrent tasks.

The Concurrent Sharing Model uses a combination of snapshot isolation and deterministic conflict resolution to simplify the parallelization of tasks that exhibit conflicts. The Concurrent Sharing Model provides various techniques wherein shared states, data, or variables are conceptually replicated on forks, and only copied or written if necessary, then deterministically merged on joins, based on the defined isolation type of the shared data, thereby allowing concurrent tasks to work with independent local copies of the shared states, data, or variables while ensuring automated conflict resolution. This model is applicable to a wide variety of system architectures, including tasks or that execute tasks on CPUs or GPUs (or some combination thereof), tasks or applications that run, in full or in part, on multi-core processors without full shared-memory guarantees, and tasks or that run within cloud computing environments.

In view of the above summary, it is clear that the Concurrent Sharing Model described herein provides various unique techniques for automated deterministic conflict resolution for joining shared tasks. In addition to the just described benefits, other advantages of the Concurrent Sharing Model will become apparent from the detailed description that follows hereinafter when taken in conjunction with the accompanying drawing figures.

DESCRIPTION OF THE DRAWINGS

The specific features, aspects, and advantages of the claimed subject matter will become better understood with regard to the following description, appended claims, and accompanying drawings where:

DETAILED DESCRIPTION OF THE EMBODIMENTS

Figure 1:
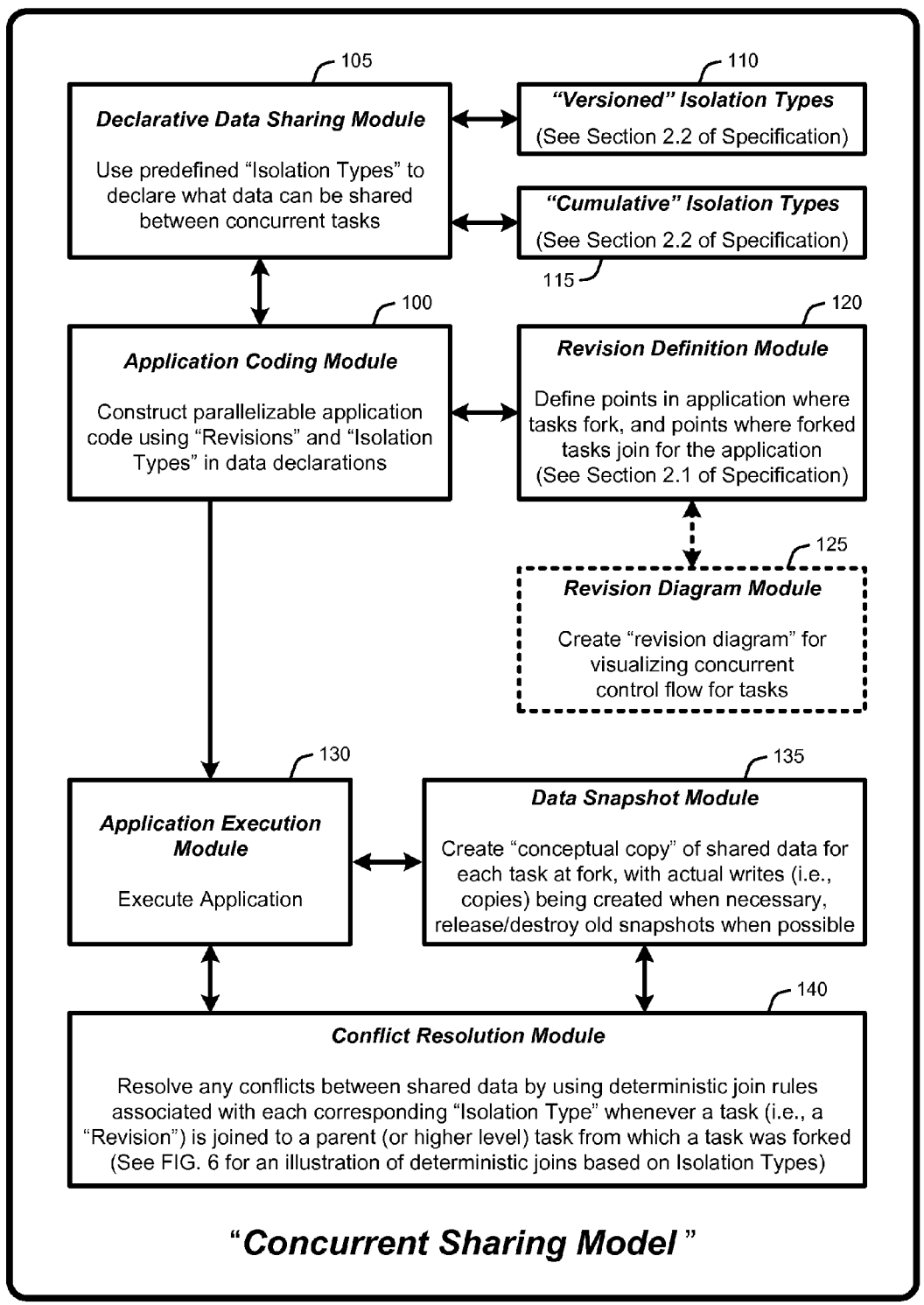
FIG. 1 provides an exemplary architectural flow diagram that illustrates various program modules for implementing various embodiments of the Concurrent Sharing Model, as described herein.

In the following description of the embodiments of the claimed subject matter, reference is made to the accompanying drawings, which form a part hereof, and in which is shown by way of illustration specific embodiments in which the claimed subject matter may be practiced. It should be understood that other embodiments may be utilized and structural changes may be made without departing from the scope of the presently claimed subject matter.

1.0 Introduction:

A "Concurrent Sharing Model," as described herein, provides various embodiments of a programming model based on "revisions" and "isolation types" for enabling concurrent revisions of states, data, or variables shared between two or more concurrent tasks or programs. Note that "revisions" and "isolation types" are specifically defined below in Section 2.1.

In general, the Concurrent Sharing Model provides a programming model that enables revisions of shared states, data, or variables to maintain determinacy despite nondeterministic scheduling between concurrent tasks or parallel tasks in reactive or interactive applications. Shared states, data, or variables are conceptually replicated on forks, and only copied or written if necessary, then deterministically merged on joins such that concurrent tasks or programs can work with independent local copies of the shared states, data, or variables while ensuring automated conflict resolution. This model is applicable to a wide variety of computing systems and architectures, including applications that execute tasks on a CPU or GPU, applications that run, in full or in part, on multi-core processors without full shared-memory guarantees, applications that run within cloud computing environments, and applications that run on any combination of the aforementioned computing systems and architectures.

In facilitating the parallelization of various tasks, the Concurrent Sharing Model is designed to perform efficiently for programs where the different tasks executing in parallel include one or more of the following characteristics:

1. The tasks are coarse-grained;
2. The tasks execute different code and have different data access patterns;
3. The tasks exhibit one or more conflicts on the shared data;
4. The tasks are generally independent at a high abstraction level (i.e., most conflicts do not express true data dependencies);

5. The tasks have varying characteristics (e.g., I/O vs. CPU bound) and may exhibit unbounded latencies; and
6. The tasks may react to external, nondeterministic events such as user inputs, sensor inputs, network communications, etc.

More specifically, the Concurrent Sharing Model provides various techniques for effectively building applications that enable concurrent execution of various tasks that may execute synchronously and/or asynchronously while ensuring automated deterministic conflict resolution for joining shared tasks. The techniques provided herein are advantageous in that they efficiently exploit parallel hardware to increase the responsiveness of multi-threaded applications or applications running on multiple CPUs, GPUs, multi-core-processors, networked or cloud computing environments, or any combination thereof. Consequently, the Concurrent Sharing Model ensures consistency of shared data while allowing tasks to execute concurrently.

Some of the basic design choices for implementing the Concurrent Sharing Model include:

1. Declarative Data Sharing: The programmer uses special "isolation types" (see Section 2.1.4) to declare what data can be shared between concurrent tasks;
2. Automatic Isolation: Whenever the programmer forks an asynchronous task (referred to herein as "revisions"—See Section 2.1), that task operates in conceptual "isolation." More specifically, conceptually, each revision operates on a private or "conceptual" copy of the entire shared state (or data), which is guaranteed to be consistent and stable. Though it should be noted that while each task operates on its own "conceptual copy" of the shared data, in various embodiments, that data is not actually physically copied (to create a "local copy") unless necessary. One example of when a local copy might be needed is when a particular forked task writes a changed copy of the shared data. This concept is discussed herein as "lazy" or on-demand copying of the data, since copies are only actually made if necessary.
3. Deterministic Conflict Resolution: When the programmer joins a revision, all write-write conflicts (data that was modified both by the joinee and the joiner) are resolved deterministically as specified by the isolation type—note that multiple different isolation types can be defined. For example, if there is a conflict on a "versioned" type variable T, written as versioned⟨T⟩, which, as discussed below, is typically the most common isolation type, the value of the joinee can be set to always overwrite the value of the joiner. Similarly, a cumulative type variable T, written as cumulative ⟨T, $f$⟩, uses a merge function $f$ to combine multiple revisions at join, rather than allowing one to simply dominate over the others. Such deterministic conflict resolution never fails, thus revisions never "roll back" as they may with conventional concurrency techniques. Note also that any desired conflict resolution rule can be defined here (based on constructing pre-defined isolation types), and that the general idea is that so long as known rules are used for joining revisions, there will be determinacy in each case.

The above described choices ensure deterministic concurrent program execution. Unlike conventional approaches, however, the Concurrent Sharing Model does not require executions to be equivalent to some sequential execution, which would unnecessarily restrict the available concurrency. Instead, the Concurrent Sharing Model provides a variety of abstractions that enable the programmer to reason about concurrent executions directly. These abstractions then allow the programmer to design code or applications which ensures that all tasks will be deterministically merged on joins.

For example, see Table 1, below, where the exemplary "assert" statements in the sample pseudo-code show the possible values of x at each point.

TABLE 1

Comparison of Conventional and New Techniques

| Conventional Asynchronous Task Operating on a Standard Integer Variable | "Revision" of the Concurrent Sharing Model Operating on a Versioned Integer Variable |
| --- | --- |
| int x = 0;<br>task t = fork {<br>   x = 1;<br>}<br>assert(x = 0 ∨ x = 1);<br>join t;<br>assert(x = 1); | versioned⟨int⟩x = 0;<br>revision r = rfork {<br>   x = 1;<br>}<br>assert(x = 0);<br>rjoin r;<br>assert(x = 1); |

Note:
The "∨" symbol shown above represents a logical "or"

The Concurrent Sharing Model eliminates the need to perform any synchronization (such as critical sections) inside tasks, though such synchronization can still be performed using conventional techniques, if desired, or if there is a specific need. Each task is thus guaranteed to see a stable snapshot of the whole shared state, on which the task can perform reads and writes at any time without risking blocking, interference, aborts, or retries, no matter how long it runs. Further, the approach provided by the Concurrent Sharing Model is data-centric in the sense that it removes complexity from the tasks (which need no longer worry about synchronization) and adds it to the data declarations (which now include a specification of the "isolation type").

1.1 System Overview:

As noted above, the "Concurrent Sharing Model," provides various techniques for ensuring automated deterministic conflict resolution for joining shared tasks. The processes summarized above are illustrated by the general system diagram of FIG. 1. In particular, the system diagram of FIG. 1 illustrates the interrelationships between program modules for implementing various embodiments of the Concurrent Sharing Model, as described herein. Furthermore, while the system diagram of FIG. 1 illustrates a high-level view of various embodiments of the Concurrent Sharing Model, FIG. 1 is not intended to provide an exhaustive or complete illustration of every possible embodiment of the Concurrent Sharing Model as described throughout this document.

In addition, it should be noted that any boxes and interconnections between boxes that may be represented by broken or dashed lines in FIG. 1 represent alternate embodiments of the Concurrent Sharing Model described herein, and that any or all of these alternate embodiments, as described below, may be used in combination with other alternate embodiments that are described throughout this document.

In general, as illustrated by FIG. 1, the processes enabled by the Concurrent Sharing Model begin operation by using an application coding module 100 to construct parallelizable or concurrent application code that makes use of "revisions" and "isolation types" in data declarations of the application code.

A declarative data sharing module 105 is used in combination with the application coding module 100 to enable the programmer to use predefined "Isolation Types" to declare what data can be shared between concurrent tasks. In other words, variables that are intended to be shared are assigned a particular "type", which further include declarations that include deterministic rules for joining shared data or variables. Note that shared data can represent anything from a variable that is concurrently used and/or modified by multiple tasks in a particular application, a document being shared between two or more local or remote users (e.g., simultaneous editing of a shared document by multiple users), or other objects or databases. As discussed in greater detail in Section 2.2, these isolation types include, but are not limited to, several "versioned" isolation types 110 and several "cumulative" isolation types 115.

A revision definition module 120 defines points in application where tasks fork, and points where forked tasks join for the application, as described in further detail in Section 2.1. In addition, an optional revision diagram module 125 can be used to create one or more "revision diagrams" that enable the programmer to visualize concurrent control flow for any tasks that make use of shared variables or other data or objects. Note that tasks may fork repeatedly, or at multiple points to spawn child tasks, and that forked tasks may be nested to any desired level, as discussed in greater detail herein.

Once the application has been coded, an application execution module 130 executes that application. Note that depending upon the type of code and the operating environment, the application code may or may not need to be compiled prior to execution. However, the issues of programming languages, operating system types, etc. are not of particular relevance to the general ideas described herein with respect to deterministically merging shared states, data, or variables on joins, based on the defined isolation type of the shared data, thereby ensuring automated conflict resolution. In other words, the Concurrent Sharing Model is capable of being implemented within a wide range of programming environments and operating systems.

During runtime of applications encoded based on the Concurrent Sharing Model, a data snapshot module 135 creates a "conceptual copy" of shared data for each task whenever a child task forms from a parent task. Actual writes (i.e., real copies that are not merely conceptual copies) are then created for any child task (i.e., any "revision") when necessary. The data snapshot module 135 also handles the release or destruction of old snapshots (i.e., those snapshots of shared data that are no longer referenced by an active task.

Finally, a conflict resolution module 140 operates to resolve any conflicts between shared data by using deterministic join rules associated with each corresponding "isolation type" whenever a task (i.e., a "revision") is joined to a parent (or higher level) task from which a task was forked. See FIG. 6 for an illustration of deterministic joins based on isolation types. Note that the deterministic rules regarding joining are independent of time. In other words, it does not matter whether a task finishes first or last or anywhere between from within a group of concurrent tasks, because the decision of which instance of shared data will prevail (i.e., which instance has priority) is simply dependent upon the predefined deterministic join rules associated with the isolation types of those tasks.

One advantageous feature of the time-independent nature of the predefined deterministic join rules is that in many cases, it will not be necessary to complete one or more tasks if they have not finished prior to a concurrent task having priority. In other words, if a particular task finishes first, with some resulting change or write to the shared data, and if that task has priority over any other unfinished tasks, it may be possible to simply terminate those unfinished tasks (depending upon what the tasks are doing), since whether or not they complete will not change the result of the shared data returned by the task having priority. Note that in contrast to this advantageous feature of the Concurrent Sharing Model, conventional Cilk++ based applications require all child tasks to complete before a parent task can complete.

2.0 Operational Details of the Concurrent Sharing Model:

The above-described program modules are employed for implementing various embodiments of the Concurrent Sharing Model. As summarized above, the Concurrent Sharing Model provides various techniques for automated deterministic conflict resolution for joining shared tasks. The following sections provide a detailed discussion of the operation of various embodiments of the Concurrent Sharing Model, and of exemplary methods for implementing the program modules described in Section 1 with respect to FIG. 1.

In particular, the following sections provides examples and operational details of various embodiments of the Concurrent Sharing Model, including: definitions and examples of "revisions"; definitions and examples of "isolation types"; an exemplary "revision calculus" for implementing the Concurrent Sharing Model; a comparison of the Concurrent Sharing Model to traditional concurrency techniques; an example of parallelization in a game-type application using the Concurrent Sharing Model; a discussion of implementation details for the Concurrent Sharing Model; and various optional optimizations for improving performance of the Concurrent Sharing Model.

2.1 "Revisions" Defined:

As noted above, the Concurrent Sharing Model uses revisions and isolation types to enable automated deterministic conflict resolution for joining shared tasks. Revisions are specifically defined in the following paragraphs along with a discussion of "revision diagrams" that are introduced as a way to reason about visibility of effects.

As discussed herein, "revisions" are specifically defined as representing a basic unit of concurrency. Revisions function similar to conventional asynchronous tasks that are forked and joined, and may themselves fork and join other tasks. The term "revision" is used to emphasize the semantic similarity to branches in source control systems, where programmers work with a local snapshot of shared source code. However, revisions differ from asynchronous tasks in at least two significant ways. First, the main thread that is executing the program is considered to be a revision, and is referred to herein as the "main revision." Thus, all code executes inside some well-defined revision. Second, the Concurrent Sharing Model ensures that all forked revisions are explicitly joined based on various rules described herein. Note that this contrasts with conventional asynchronous tasks for which join operations are usually optional.

Figure 2:
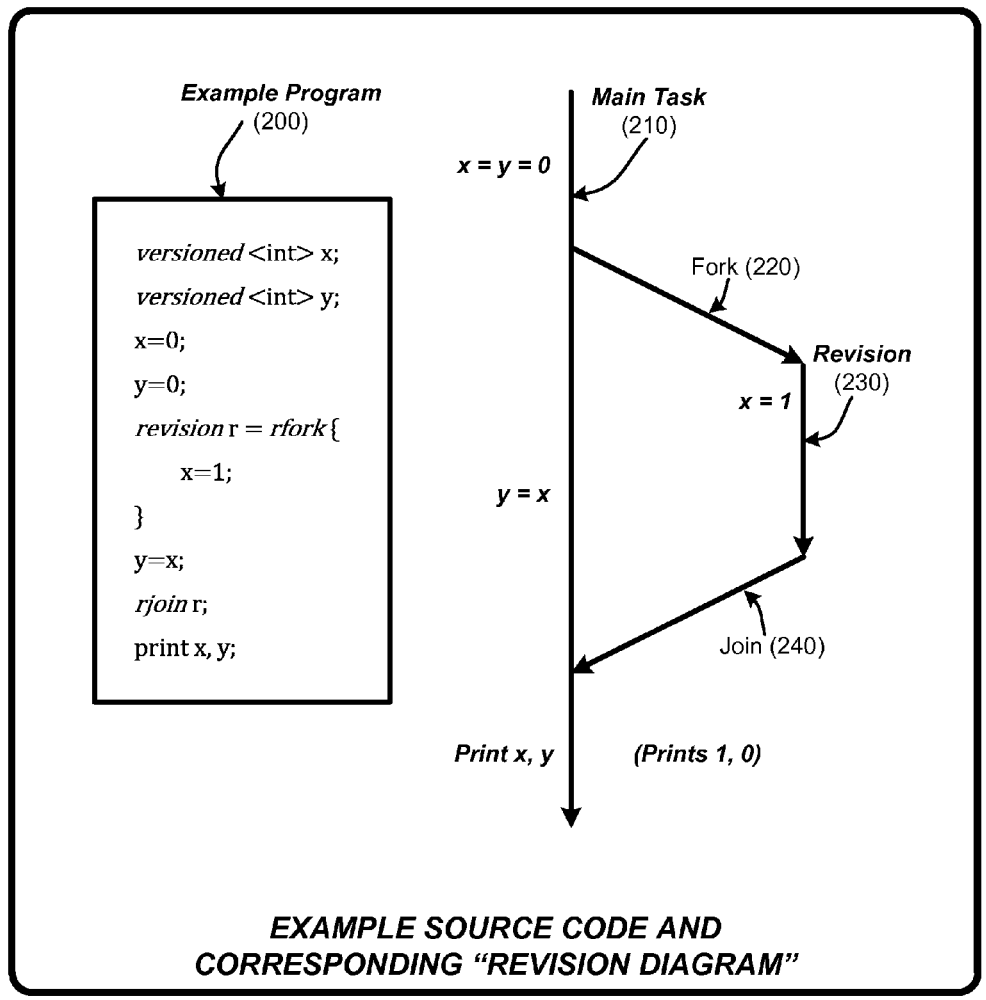
FIG. 2 provides an example of source code constructed using the Concurrent Sharing Model, and a "revision diagram" corresponding to the exemplary source code, as described herein.

2.1.1 Revision Diagrams:

One of the most basic aspects of revisions is that they provide a precise way to reason about how tasks may see or not see each other's effects. To this end, it is useful to visualize concurrent control flow using "revision diagrams" such as illustrated by FIG. 2. For example, FIG. 2 provides an example of a revision diagram (210 through 240) (on the right) representing the execution of an example program 200 (on the left). Revisions correspond to vertical lines in the diagram, and are connected by angled arrows that represent the forks and joins. Revisions are labeled with the actions they perform, and are used to visualize clearly how information may flow (it follows the lines) and how effects become visible upon the join.

More specifically, FIG. 2 shows that the main revision, labeled here as main task 210, is the main or primary task from which other tasks fork and join. In this example, there is one fork 220, which leads from the main task 210 to another task represented by revision 230. Join 240 then joins the revision 230 to the main task 210. In this example, it can be seen from both the example program 200, and the revision diagram, that the main task 210 first sets both x and y equal to 0. The fork 220 then leads to a new task, i.e., the revision 230 that runs concurrently to the main task 210 while operating on x (i.e., x=1). Concurrently with the revision 230, the main task 210 is setting y=x. Next, the join 240 rejoins the revision 230 to the main task 210, where the value of x is made determinate based on how the data declarations have been programmed. Consequently, in this case, even though the x=1 task occurs concurrently with the task of setting y=x, y still maintains the original value of 0 since the operation of y=x occurs prior to the join 240, and since the revision 230 was operating on it own isolated "conceptual copy" of the shared data (i.e., x).

Note that the use of revision diagrams to reason about program executions is a marked departure from traditional concurrency models such as sequentially consistent memory or serializable transactions, which reason about concurrent executions by considering a set of corresponding totally ordered sequential histories. These traditional models make the fundamental assumption that programmers must think sequentially, and that all concurrency must thus be 'linearized' by some arbitration mechanism. However, such arbitration invariably introduces nondeterminism, which may easily present a much larger problem for programmers than direct reasoning about concurrent executions. In contrast, the Concurrent Sharing Model allows the user to directly reason about the concurrent execution by visualizing concurrent effects and isolation guarantees using revision diagrams, while having deterministic join results.

Figure 3:
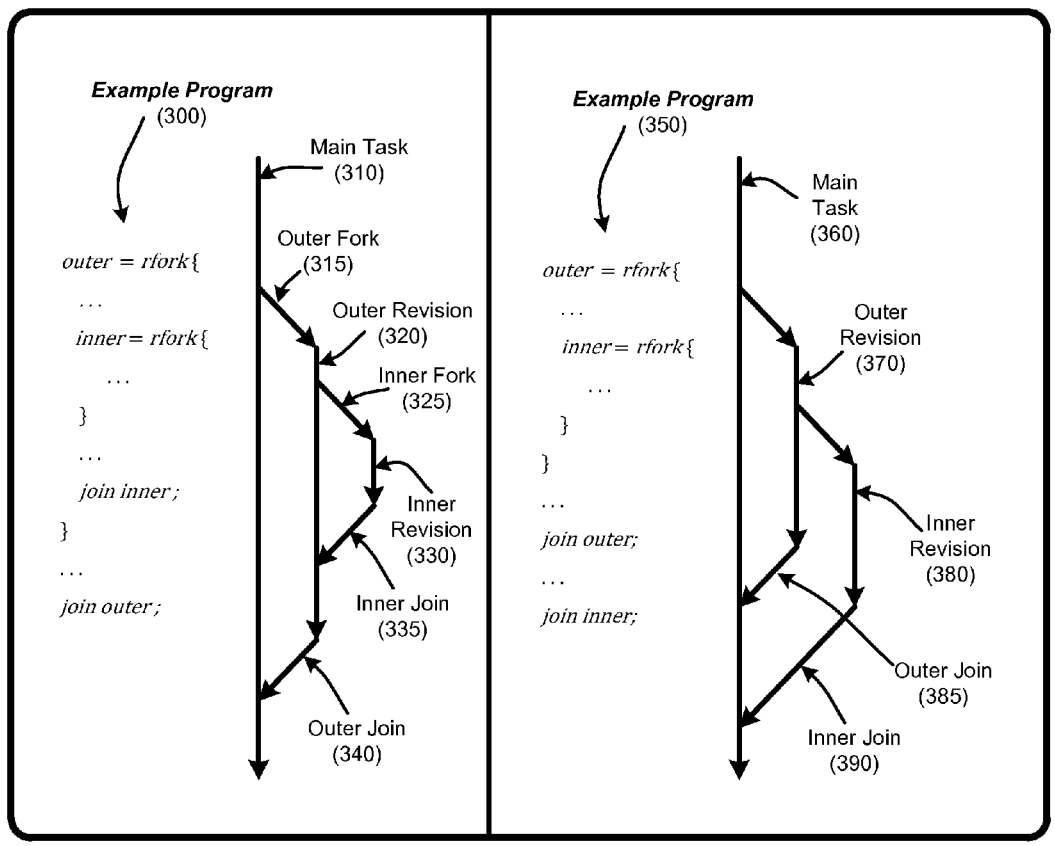
FIG. 3 provides an example program having forks and joins, and a "revision diagram" corresponding to the exemplary program, as described herein.

2.1.2 Nested Revisions:

To simplify modular reasoning about program executions, it is useful to allow revisions to be nested in a variety of ways. FIG. 3 illustrates two simple examples of how revisions may be nested. On the left of FIG. 3, is a revision that forks its own inner revision, and then joins it. This corresponds to classical nesting of tasks. More specifically, an example program 300 corresponds to the adjacent revision diagram, which illustrates a main task 310. This main task 310 forks via an outer fork 315 to an outer revision 320. In turn the outer revision 320 forks via an inner fork 325 to an inner revision 330. Next, an inner join 335 joins the inner revision 330 to the outer revision 320. Finally, an outer join 340 joins the outer revision 320 to the main task 310.

Similarly, the example on the right of FIG. 3 demonstrates how an inner revision "survives" the join of the revision that forked it, and gets subsequently joined by the main revision. In particular, an example program 350 corresponds to the adjacent revision diagram, which illustrates a main task 360. This main task 360 forks to an outer revision 370. In turn the outer revision 370 forks to an inner revision 380. However, in contrast to the previous example, the outer revision 370 then joins the main task 360 via an outer join 385 prior to an inner join 390 that joins the inner revision 380 directly to the main task 360.

Figure 4:
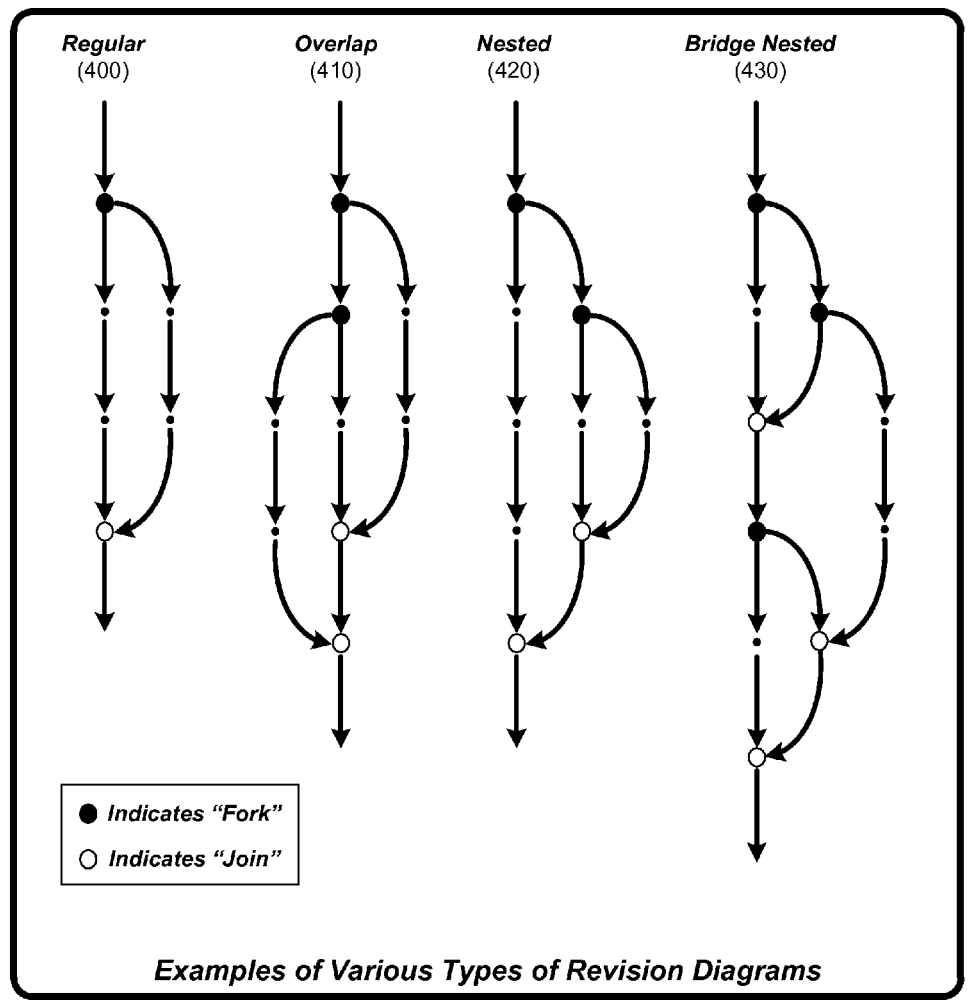
FIG. 4 provides an example of various types of "revision diagrams," as described herein.

In general, as illustrated above, revisions can be nested. Further, inner revisions may be joined before or after the outer revision is joined. In addition, multiple levels of nesting are also possible, e.g., an "inner inner revision" forking and joining an outer revision. For example, FIG. 4 illustrates a progression of revision diagram nesting examples. "Regular" 400 revision diagrams and "overlap" 410 revision diagrams do not nest revisions beyond a depth of 1 (that is, only the main revision is forking and joining revisions, as illustrated). A "nested 420 diagram shows simple nesting, where a revision forks a child of depth 2 and then joins it (before being joined itself), though it should be understood that such nesting is not limited to any particular depth. Next a "bridge nested" 430 revision diagram shows that child revisions can "survive" their parents (i.e. be joined later), and that revisions can be joined by a different revision than where they were forked. Finally, it should be understood that any of these types of revision diagrams (corresponding to programs coded using the Concurrent Sharing Model) may be combined to any degree of complexity desired.

Figure 5:
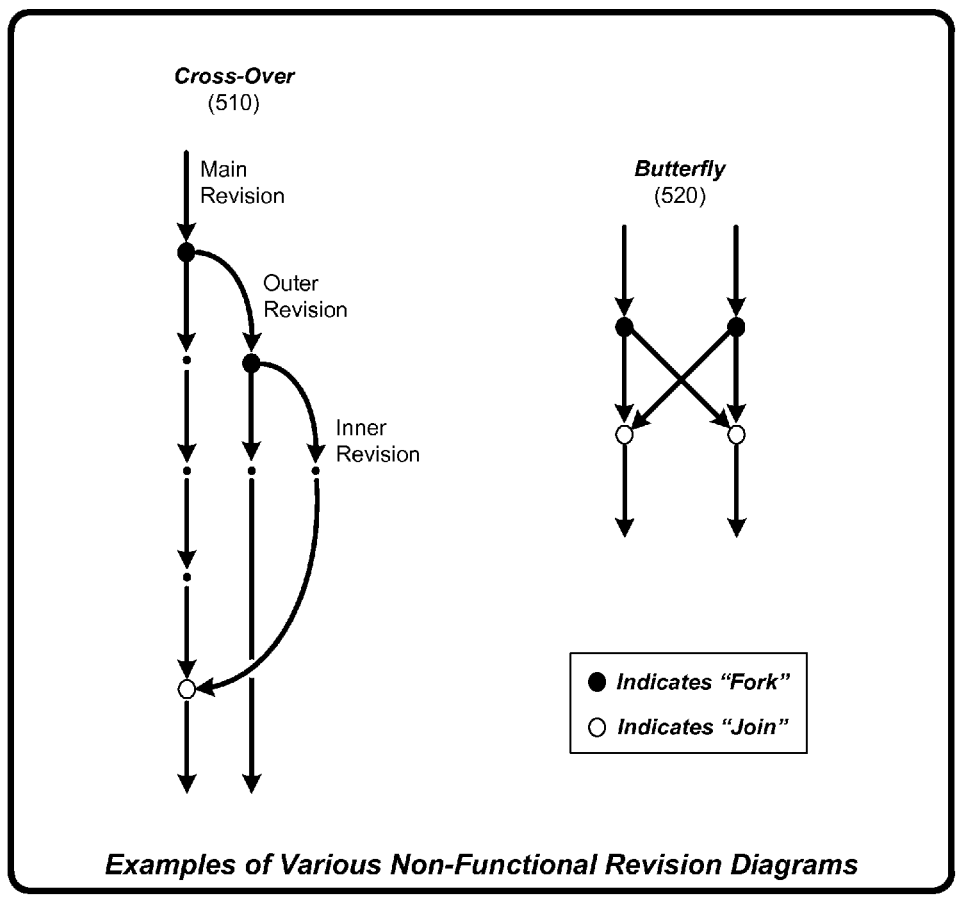
FIG. 5 provides an example of various types of non-functional "revision diagrams," as described herein.

However, revision diagrams are semi-lattices, and thus, not all revision diagrams are functional because revision handles flow along edges of the revision diagram. FIG. 5 provides two simple examples of non-functional revision diagrams. In particular, FIG. 5 illustrates a "cross-over" 510 type revision diagram where an inner revision is shown to join a main revision by crossing over an outer revision. This illustrated cross-over 510 is non-functional since, the main revision cannot join a revision before it has access to its handle (the handle returned by the second fork (to the inner revision) becomes accessible to the main revision only after the outer revision has been joined). For similar reasons, butterfly 520 type revision diagrams are also non-functional. Note however, that it would be possible to enable these types of revision diagrams by specifying particular determinacy rules to handle these types of special cases. However, allowing these types of diagrams (and corresponding revision relationships) would generally make it more difficult to visualize task determinacy, thereby increasing the burden on a programmer making use of the Concurrent Sharing Model when coding applications or tasks.

Similar to asynchronous tasks, revisions are a basic building block that can be used to express many different forms of concurrency or parallelism. Often, it is desirable to first fork a number of revisions, and then immediately join all of them. This pattern is sometimes called the fork-join pattern and is common for divide-and-conquer algorithms. Revisions are more general though and their lifetime is not restricted by the lexical scope, and can for example be used to model long-running background tasks. Particularly, there is no implicit join at the end of each function as in conventional Cilk frameworks.

2.2 Isolation Types:

"Isolation types" are specifically defined as one of two categories that determine how revisions are joined. In other words, when joining revisions, the Concurrent Sharing Model follows different rules, depending upon the isolation type of shared data, when merging copies of that shared data back together. Exactly how that should be done depends on what the data is representing, which is not easily inferred automatically. Consequently, rather than increasing the complexity of the Concurrent Sharing Model unnecessarily, the programmer explicitly supplies this information by choosing an appropriate type for the data. Choosing the right isolation type for every single shared object, field or variable may seem daunting at first. However, in programming various applications, such as, for example, parallelizing a game application (see Section 2.5) it was observed that just a few isolation types cover almost all situations, with those types then falling into one of two general categories of isolation types, i.e., "versioned" types and "cumulative" types. Note however, that additional types or categories of isolation types may be defined, if desired, to address particular concurrency issues for particular applications or tasks.

Figure 6:
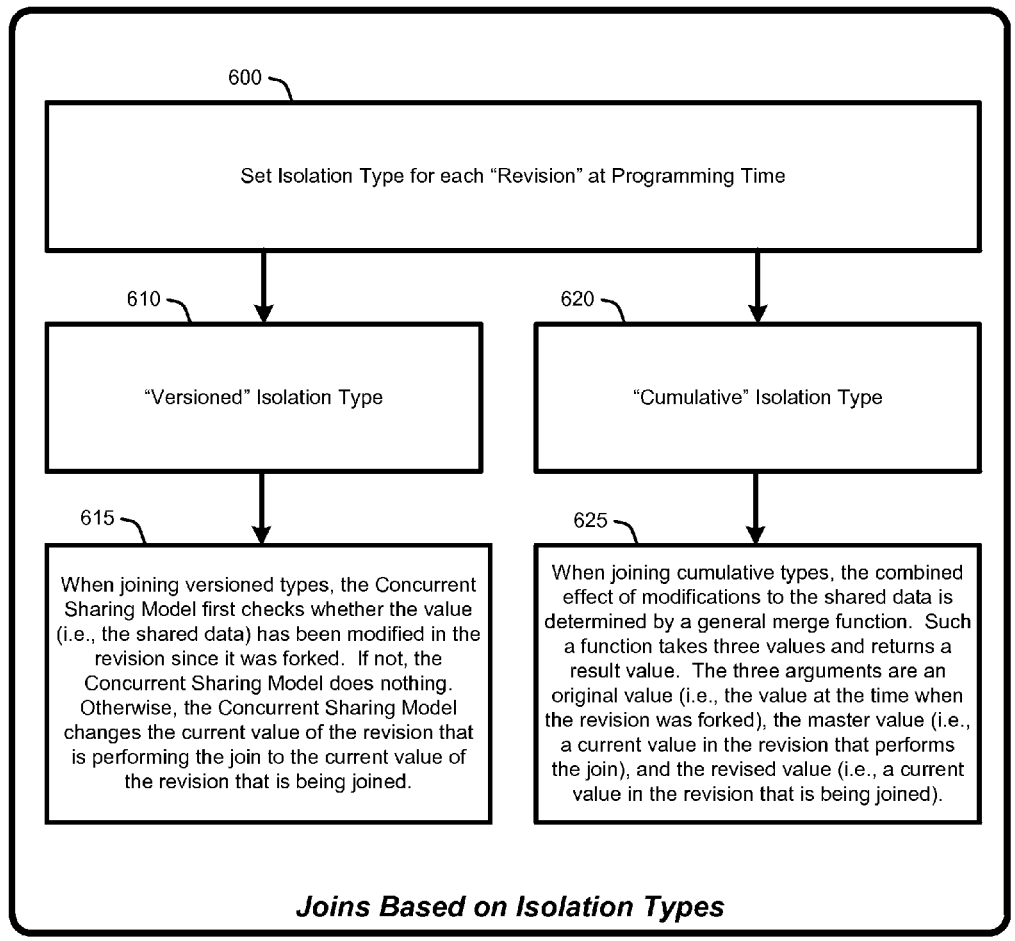
FIG. 6 provides an exemplary flow diagram that illustrates joins based on "Isolation Types," as described herein.
Figure 7:
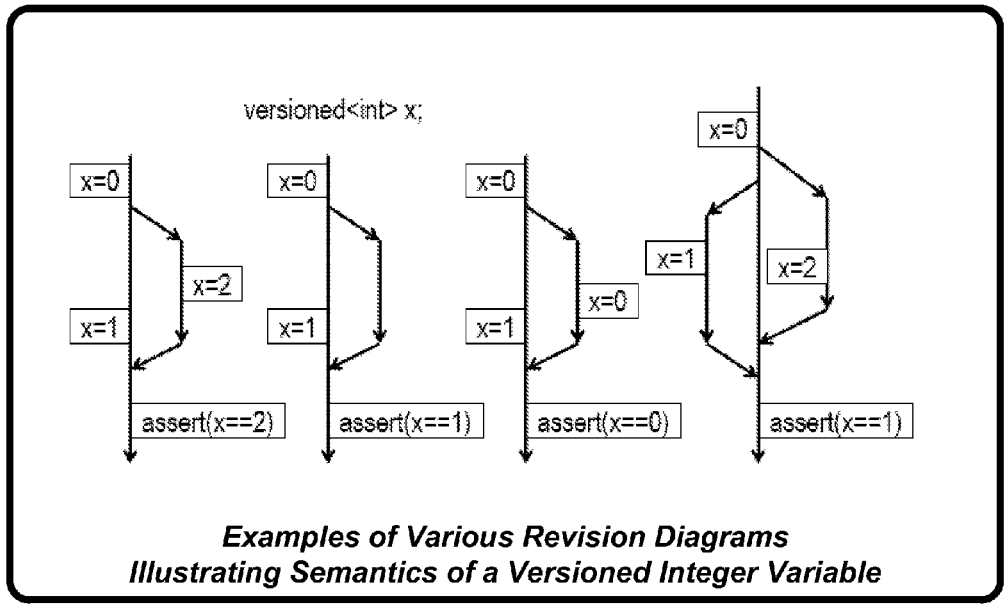
FIG. 7 provides an example of various revision diagrams illustrating semantics of a "versioned" type integer variable, as described herein.

In general, as illustrated by FIG. 6, the "isolation type" is explicitly supplied or set 600 at programming time, by choosing an appropriate type for the data that is to be shared. As noted above, isolation types generally fall into one of the following two major categories:

1. Versioned Types. When joining versioned types 610, the Concurrent Sharing Model first checks 615 whether the value (i.e., the shared data) has been modified in the revision since it was forked. If not, the Concurrent Sharing Model does nothing. Otherwise, the Concurrent Sharing Model changes the current value of the revision that is performing the join to the current value of the revision that is being joined (see FIG. 7, for various examples of revision diagrams using versioned types). A basic versioned type T is written as versioned ⟨T⟩ for the corresponding versioned type.

2. Cumulative Types. When joining cumulative types 620, the combined effect of modifications to the shared data is determined 625 by a general merge function. Such a function takes three values and returns a result value. The three arguments are an original value (i.e., the value at the time when the revision was forked), the master value (i.e., a current value in the revision that performs the join), and the revised value (i.e., a current value in the revision that is being joined). A basic cumulative type T is written as cumulative ⟨T, $f$⟩ for the corresponding cumulative type with a merge function $f$. A simple example of this concept is an integer variable to which several revisions add some quantity, and for which the cumulative effect of these additions is the sum of the shared data.

In the aforementioned game application (see Section 2.5), versioned types are an appropriate choice for data on which concurrent modifications do not often happen (e.g., many variables were concurrently written/read, but only a few were concurrently written), or for situations in which there is clear relative priority between tasks (in the sense that some tasks should override the effects of other tasks).

Figure 8:
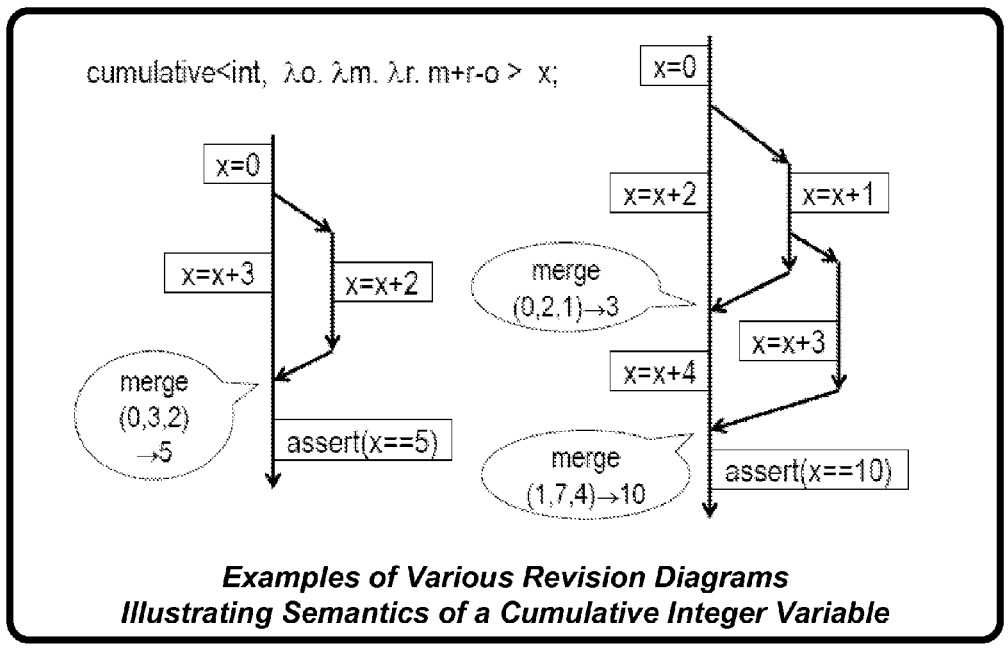
FIG. 8 provides an example of various revision diagrams illustrating semantics of a "cumulative" type integer variable, as described herein.

With respect to cumulative types, consider an example wherein an integer variable to which several revisions add some quantity, and for which the cumulative effect of these additions is the sum. In this case, the programmer will define a merge function, such as, for example:

```
int merge (int original, int master, int revised)
{
return (master + revised − original);
}
``` which produces the desired result (as illustrated by the revision diagrams provided in FIG. 8). Note that in the aforementioned game application (see Section 2.5), cumulative types were used for collections (lists or sets) where tasks were adding elements concurrently.

One interesting aspect of using isolation types is the question of data granularity. In particular, sometimes, the values of variables are correlated in the sense that they may be subject to some invariant. For example, valid values for the coordinate variables x and y may be restricted to a unit circle. Then, assigning only one of them may appear to locally preserve that invariant, while it is not globally preserved (See FIG. 9, for example, which illustrates the difference between versioning two separate variables, and versioning a pair of variables). The solution in this case is either to ensure that both variables are assigned, or to group them together using a composite type.

2.3 Revision Calculus:

For reference and to remove potential ambiguities, the following paragraphs present one example of a formal calculus for revisions and isolation types. Note however, that this is simply one example of a revision calculus for implementing the concurrency-based techniques described herein, and that the Concurrent Sharing Model is not specifically limited to the revision calculus described below.

Before presenting the revision calculus, several notations will be introduced to simply work with partial functions:

1. For sets A, B, "AB" is used to indicate the set of partial functions from A to B.

2. For $f$, $g \in AB$, $a \in A$, $b \in B$, and $A' \subset A$, the following notations are used: $f(a) = \bot$ means $a \notin \text{dom} f$, $f[a \mapsto b]$ is the partial function that is equivalent to $f$ except that $f(a) = b$, and $f::g$ is the partial function that is equivalent to g on dom g and equivalent to $f$ on A\dom g. In transition rules used by the Concurrent Sharing Model, patterns of the form $f(a_1:b_1) \ldots (a_n:b_n)$ (where $n \geq 1$)) are used to match partial functions $f$ that satisfy $f(a_i) = b_i$ for all $1 \leq i \leq n$.

Given the notations presented above, the formal the syntax and semantics of revision calculus is provided in Table 2, below. In general, the syntax represents a standard functional calculus, augmented with references. References can be created (ref e), read (!e), and assigned (e:=e). The result of a fork expression (rfork e) is a revision identifier from the set (Rid), and can be used in a (rjoin e) expression (note that e is an expression, not a constant, thus the revision being joined can vary dynamically).

To define evaluation order within an expression, execution contexts are syntactically defined, as illustrated in Table 2, below. An execution context $\mathcal{C}$ is an expression "with a hole", where $\mathcal{C}[e]$ is the expression obtained from $\mathcal{C}$ by replacing the hole with e'.

The operational semantics provided in Table 2, below, illustrate transitions of the form s→$_r$ s' which represent a step by revision r from global state s to global state s'. Consider first the definition of global states in Table 2, below. A global state is defined as a partial function from revision identifiers to local states: there is no shared global state. The local state has three parts (σ, τ, e): the snapshot σ is a partial function that represents the initial state that this revision started in, the local store τ is a partial function that represents all the locations this revision has written to, and e is the current expression.

The rules for the operational semantics illustrated in Table 2, below, all follow the same general structure: a transition s→$_r$ s' matches the local state for r on the left, and describes how the next step of revision r changes the state.

The first three rules in Table 2 (i.e., apply, if—true, and if—false) reflect standard semantics of application and conditional. They affect only the local expression. The next three rules (i.e., new, get, and set) reflect operations on the store. Thus, they affect both the local store and the local expression. The (new) rule chooses a fresh location (using the expression l∉s to express that l does not appear in any snapshot or local store of s).

The last two rules (i.e., fork and join) reflect synchronization operations. The rule (fork) starts a new revision, whose local state consists of: (1) a conceptual snapshot that is initialized to the current state σ::τ; (2) a local store that is the empty partial function; and (3) an expression that is the expression supplied with the fork. Note that (fork) chooses a fresh revision identifier (using the expression r∉s to express that r is not mapped by s, and does not appear in any snapshot or local store of s). The rule (join) updates the local store of the revision that performs the join by merging the snapshot, master, and revision states (in accordance with the declared isolation types), and removes the joined revision. The rule (join) can only proceed if the revision being joined has executed all the way to a value (which is ignored).

Finally, the step relation "→" is defined to be the union of the local step relations →$_r$. A global state s is called an "initial state" if it is of the form s={(r,(∈, ∈, e)}. A sequence of steps, $s_0 \to s_1 \to \ldots \to s_n$, is called an "execution" if $s_0$ is an initial state, and "maximal" if there exists no s' such that $s_n \to s'$.

concurrency (too coarse) or provide insufficient isolation (too fine), as some of the objects may be rendered at a future position, while others are rendered at a current position.

For this reason, replication is often a necessary ingredient to achieve parallelization of application tasks. Games, for example, may maintain two copies of the shared state (using so-called double-buffering) to guarantee isolation of tasks while enabling any number of read-only tasks to execute concurrently with a single writer task. However, this pattern is

TABLE 2

Syntax and Semantics of the Revision Calculus

Syntactic Symbols

| v | ∈ | Value | = | c\|l\|r\|λx. e |
| c | ∈ | Const | = | unit\|false\|true |
| l | ∈ | Loc | | |
| r | ∈ | Rid | | |
| x | ∈ | Var | | |
| e | ∈ | Expr | = | v\|x |
| | | | \| | e e\|(e ? e: e) |
| | | | \| | ref e\| !e\|e: = e |
| | | | \| | rfork e\|rjoin e |

State

| s | ∈ | GlobalState | = | RidLocalState |
| | | LocalState | = | Snapshot × LocalStore × Expr |
| σ | ∈ | Snapshot | = | LocValue |
| τ | ∈ | LocalStore | = | LocValue |

Execution Contexts $\mathcal{C}$ = [ ]
 | $\mathcal{C}$ e|v $\mathcal{C}$|($\mathcal{C}$ ? e: e)
 | ref $\mathcal{C}$|!$\mathcal{C}$ | $\mathcal{C}$: = e|l: = $\mathcal{C}$
 | rjoin $\mathcal{C}$ Operational Semantics

| (apply) | s(r:⟨σ,τ,$\mathcal{C}$ [λx. e v] ⟩) | →$_r$ s[r ↦ ⟨σ,τ,$\mathcal{C}$ [[v/x]e]⟩] |
| (if - true) | s(r:⟨σ,τ,$\mathcal{C}$ [(true ? e: e')] ⟩) | →$_r$ s[r ↦ ⟨σ,τ,$\mathcal{C}$ [e]⟩] |
| (if - false) | s(r:⟨σ,τ,$\mathcal{C}$ [(false ? e: e')] ⟩) | →$_r$ s[r ↦ ⟨σ,τ,$\mathcal{C}$ [e']⟩] |
| (new) | s(r:⟨σ,τ,$\mathcal{C}$ [ref v] ⟩) | →$_r$ s[r ↦ ⟨σ,τ[l ↦ v],$\mathcal{C}$ [l]⟩], if l ∉ s |
| (get) | s(r:⟨σ,τ,$\mathcal{C}$ [! l] ⟩) | →$_r$ s[r ↦ ⟨σ,τ,$\mathcal{C}$ [(σ: : τ)(l)]⟩], if l ∈ dom σ: : τ |
| (set) | s(r:⟨σ,τ,$\mathcal{C}$ [l: = v] ⟩) | →$_r$ s[r ↦ ⟨σ,τ[l ↦ v],$\mathcal{C}$ [unit]⟩] |
| (fork) | s(r:⟨σ,τ,$\mathcal{C}$ [rfork e] ⟩) | →$_r$ s[r ↦ ⟨σ,τ,$\mathcal{C}$ [r']⟩] [r' ↦ ⟨σ: : τ, ε, e⟩], if r' ∉ s |
| (join) | s(r:⟨σ,τ,$\mathcal{C}$ [rjoin r'] ⟩) (r':⟨σ',τ',v⟩) | →$_r$ s[r ↦ ⟨σ, merge(σ',τ,τ'),$\mathcal{C}$ [unit]⟩] [r' ↦ ⊥] | where merge(σ', τ, τ')(l) = 2l $\begin{cases} \tau(l) & \text{if } \tau'(l) = \bot \\ \tau'(l) & \text{if } \tau'(l) \neq \bot \text{ and l is of type versioned} \langle T \rangle \\ f(\sigma'(l), \tau(l), \tau'(l)) & \text{if } \tau'(l) \neq \bot \text{ and l is of type cumulative} \langle T, f \rangle \end{cases}$ 2.4 Comparison to Traditional Concurrency Techniques:

The following paragraphs review common implementation techniques for parallelizing application tasks and how they relate to "revisions." In particular, the following paragraphs elaborate the semantic differences between revisions and transactions, and discuss related work.

2.4.1 Traditional Locking and Replication:

Sometimes, standard locking schemes are appropriate for safely sharing data between tasks. However, locking complicates the code because it requires programmers to think about the placement of critical sections, which involves nontrivial tradeoffs and complicates code maintenance.

Moreover, locking alone does not always suffice. For example, consider a game application which executes concurrently (1) a physics task which updates the position of all game objects based on their speed and the time elapsed, and (2) a render task which draws all objects onto the screen. Then, any solution based solely on locks would either hamper somewhat specific to the synchronization structure of games, and maintaining just two buffers is not always enough (for example, there may be multiple concurrent modifications, or snapshots may need to persist for more than a single frame). Moreover, performing a full replication of every shared state is clearly not the most space-efficient solution.

Another common replication-based solution is to use immutable objects to encode shared states. Any tasks that wish to modify an immutable object must instead create a copy. This pattern can efficiently guarantee isolation and enables concurrency. However, it can introduce new challenges, such as how to resolve conflicting updates, or how to bound space requirements in situations where frequent modifications to the data may cause excessive copying. In contrast to these conventional techniques, "revisions", as described herein, solve both of these problems by implicitly linking the copying and merging to the concurrent control flow, and by using programmer-declared isolation types to resolve conflicts deterministically.

2.4.2 Related Work on Transactions:

Similar to the revisions described herein, conventional transactions or transactional memory address the problem of handling concurrent access to shared data. However, one difference between transactions and revisions is that transactions (whether optimistic or pessimistic) handle conflicts nondeterministically, while revisions resolve conflicts deterministically. Moreover, revisions do not guarantee serializability, one of the hallmarks of transactions, but provide a different sort of isolation guarantee (as discussed above). The following pseudo-code presented in Table 3 provides an example that highlights the semantic difference between revisions and transactions using exemplary procedures, "foo" and "bar":

TABLE 3

Pseudo-Code Illustrating Semantic Differences between Revisions and Isolation types, and Conventional Transactions

| void foo( ) {     if (y = 0)         x = 1; } | void bar( ) {     if (x = 0)         y = 1; } |
|---|---|
| Revisions and Isolation Types | Transactions |
| versioned < int > x,y; <br> x = 0; y = 0; <br> revision r = rfork { foo( ); } <br> bar( ); <br> rjoin r; <br> assert(x = 1 ∧ y = 1); | int x, y; <br> x = 0; y = 0; <br> task t = fork { atomic { foo( ); } } <br> atomic { bar( ); } <br> join t; <br> assert((x = 1 ∧ y = 0) ∨ (x = 0 ∧ y = 1)); |

Note that in the pseudo-code presented above, the assert statements indicate the possible final values, which are different in each case. Further, the transactional program (right column) has two possible executions, both of which are different from the single (deterministic) execution of the program that uses revisions and isolation types (left column).

Proponents of transactions have long recognized that providing strong guarantees such as serializability or linearizability can be overly conservative for some applications, and have proposed alternate guarantees such as multi-version concurrency control or snapshot isolation (SI). SI transactions are similar to revisions insofar as they operate on stable snapshots and do not guarantee serializability. However, in contrast to the revisions described herein, transactions are more restricted as they do not perform deterministic conflict resolution (but rather abort transactions in schedule-dependent and thus nondeterministic ways) and do not support nesting of transactions in a comparably general manner.

Finally, optimistic transactions do not fare well in the presence of conflicts that cause excessive rollback and retry. Moreover, combining optimistic transactions with I/O is done under various restrictions because the latter cannot always be rolled back. None of these issues arises with revisions as they are not optimistic and never require rollback.

2.4.3 Related Work on Deterministic Concurrency:

Recently, researchers have proposed programming models for deterministic concurrency. These models differ semantically from revisions, and are quite a bit more restrictive: as they guarantee that the execution is equivalent to some sequential execution, they cannot easily resolve all conflicts on commit (like revisions do) and therefore restrict tasks from producing such conflicts either statically (by type system) or dynamically (pessimistic with blocking, or optimistic with abort and retry). Also, unlike our revisions, some of these models allow only a restricted "fork-join" form of concurrency. Hardware architects have also proposed supporting deterministic execution. However, these mechanisms guarantee determinism only, not isolation.

2.4.4 Related Work on Objects Similar to Isolation Types:

Isolation types are similar to Cilk++ hyperobjects in that both use type declarations by the programmer to change the semantics of shared variables. Cilk++ hyperobjects may split, hold, and reduce values. Although these primitives can (if properly used) achieve an effect similar to revisions, they do not provide similarly seamless semantics. In particular, the determinacy guarantees are fragile, i.e., guarantees do not hold for all programs. For instance, the following Cilk++ code may finish with either x=2 or x=1, and thus has no guaranty of determinacy:

```
reducer_opadd < int > x = 0;
cilk_spawn {x + +}
if (x = 0) x + +;
cilk_sync
```

Isolation types are also similar to the idea of transactional boosting, coarse-grained transactions, and semantic commutativity, which eliminate false conflicts by raising the abstraction level. However, in contrast to these conventional ideas, Isolation types go farther: for example, the type versioned⟨ T⟩ does not just avoid false conflicts, it actually resolves true conflicts deterministically.

Finally, note that isolation types do not suffer from the well-known weak-vs. strong-atomicity problem because all code executes inside some revision. The insight that automatic object replication can improve performance also appears in work on parallelizing compilers.

2.4.5 Related Work on Fork-Join Models:

Once a revision is forked, its handle can be stored in arbitrary data structures and be joined at an arbitrary later point of time. The join is always explicitly requested by the programmer: this is important as it has side effects.

Some languages statically restrict the use of joins, to make stronger scheduling guarantees (as done in Cilk++), or to simplify the most common usage patterns and to eliminate common user mistakes (as done in X10). In fact, many models use a restricted "fork-join" parallelism. However, such restrictions (while reasonable for data-parallel problems) can make it difficult to write applications that adapt to external nondeterminism or to unpredictable latencies.

For example, in the game described below in Section 2.5, an autosave task is run in the background as it has unpredictable latency, rather than forcing a join at the end of the frame. This is easily accomplished using the Concurrent Sharing Model, but more difficult using conventional concurrency techniques.

2.5 Example of Parallelization in a Game-Type Application:

The following paragraphs describe a case study on how an example application was parallelized using the Concurrent Sharing Model. The example application is a full-featured multiplayer game called "SpaceWars3D". The following paragraphs describe changes to the application involved in parallelizing the game using revisions and isolation types. More specifically, the following paragraphs first describe the sequential game application and why parallelization is a challenge. Next, a description of how revisions were used to parallelize the game loop is presented along with a discussion of how the shared data was wrapped using isolation types. Finally, the following paragraphs also discuss how nondeterminism is addressed in the example application.

Note that the code and discussion of the multiplayer game called "SpaceWars3D" is provided for illustration purposes: Neither the code shown, nor any part of the game implementation discussed in this section, is the subject of any claims in this document.

2.5.1 Multiplayer Game:

The aforementioned game application is a multiplayer game called "SpaceWars3D". Originally, this game was designed to teach DirectX programming with C#. The original code amounts to about 12,000 lines, with ample opportunity for executing different tasks in parallel and for parallelizing individual tasks. One challenge is to ensure that the data is concurrently available, yet remains consistent.

The starting point is a completely sequential game loop design shown as pseudo-code in the left column of Table 4, below. This game loop suffers from some major performance issues:

1. Not Parallel Enough: There is room to parallelize tasks. For instance, in the sequential version of the main loop, the CollisionCheck(i) could be executed in parallel but are performed sequentially. Also, although the render task RenderFrameToScreen cannot itself be parallelized (due to restrictions in the framework), it can execute in parallel with other tasks.
2. Not Responsive Enough: The periodic automatic Save-Game call that occurs every 100 frames has unpredictable latency, and causes annoying freezes in the game experience.

The intent was to use the Concurrent Sharing Model to improve the frame rate and make the gameplay smoother, by parallelizing tasks that were sequential in the original game implementation. In general, there were numerous conflicts between these tasks that were addressed by the Concurrent Sharing Model (see pseudo-code the right column of Table 4, which illustrates a parallelized version of the main loop of the game). For example, consider the coordinates of game objects (e.g., moving ships, bullets, asteroids, etc.). All of the following tasks (shown in Table 4) may potentially access these coordinates at the same time:

RenderFrameToScreen reads the position of all objects.

UpdateWorld modifies the positions of all objects based on the elapsed time.

CollisionCheck(i) reads the positions of all objects and may also modify some positions. These modifications are supposed to override the updates done by UpdateWorld.

SendNetworkUpdates reads positions of local objects and sends them to a remote player.

HandleQueuedPackets receives updates from the remote player and modifies positions of local objects. These updates are supposed to override the updates done by UpdateWorld and by CollisionCheck(i).

AutoSave reads the positions of all objects.

TABLE 4

Conceptual Game Architecture with Pseudo-Code

Sequential Version of Main Loop

```
while (! done)
{
    input. GetInput( );
    input. ProcessInput( );
    physics. UpdateWorld( );
    for (int i = 0; i < physics. numsplits; i + +)
        physics. CollisionCheck(i);
    network. SendNetworkUpdates( );
    network. HandleQueuedPackets( );
    if (frame % 100 = 0)
        SaveGame( );
    ProcessGuiEvents( );
    screen. RenderFrameToScreen( );
    audio. PlaySounds( );
    frame + +;
}
```

Parallelized Version of Main Loop
Using the Concurrent Sharing Model

```
Revision UpWrl, SendNtw, HdlPckts, AutoSave;
Revision [ ] ColDet = new Revision [physics. numsplits];
while (! done)
{
    input. GetInput( );
    UpWrl = rfork {
        input. ProcessInput( ); physics. UpdateWorld( );
    }
    for (int i = 0; i < physics. numsplits; i + +)
        ColDet[i] = rfork { physics. CollisionCheck(i); }
    SendNtw = rfork {network. SendNetworkUpdates( );}
    HdlPckts = rfork {network. HandleQueuedPackets( );}
    if (frame % 100 = 0 ∧ AutoSave = null)
        Autosave = rfork { SaveGame( );}
    ProcessGuiEvents( );
    screen. RenderFrameToScreen( );
    join(UpWrl);
    for (int i = 0; i < physics. numsplits; i + +)
        joinColDet[i];
    join(SendNtw);
    join(HdlPckts);
    if (AutoSave ≠ null ∧ AutoSave. HasFinished( )) {
        join(AutoSave);
        AutoSave = null;
    }
    audio. PlaySounds( );
    frame + +;
}
```

All of the tasks are expected to work with a consistent view of the data. This can be challenging to achieve without some form of support from the framework provided by the Concurrent Sharing Model.

Although tasks are sensitive to instability of the shared data, it is often acceptable to work with slightly stale data. For example, SendNetworkUpdates could be moved to the top of the loop without harm, because it would simply send the positions of the last frame which is perfectly acceptable. This illustrates that the precise semantics of the sequential game loop are not set in stone: parallelization may make slight changes as long as the overall behavior of the game remains approximately the same.

2.5.2 Parallelization:

The following paragraphs describe the process that was performed to parallelize the game. This process generally involved two main steps: 1) parallelizing the game loop using revisions; and 2) declaring shared data using isolation types. This process involved making choices that require understanding of the semantics of the game: to achieve better parallelism, the parallel loop is not fully equivalent to the sequential loop, but "close enough" that the overall behavior of the game remains approximately the same.

As noted above, pseudo-code representing the parallel version of the game loop is provided in Table 4, right column. Note that pseudo-code is provided rather than the actual C# code for the sake of using a more concise syntax and omitting details unrelated to the discussion. All tasks are now inside concurrent revisions, except for four tasks that have to remain on the main thread because of restrictions of the GUI and graphics frameworks.

In each iteration, revisions are forked, and their handles stored. Each CollisionCheck(i) is in a separate revision. AutoSave only forks a revision every 100 frames, and only if there is not an autosave still in progress. After forking all revisions, the main thread performs a render task and processes GUI events. Then it joins all the revisions; however, it joins the autosave revision only if it has completed. Note that the concurrent revisions are joined in an order such that conflicting updates are correctly prioritized (i.e., in this example, collision check overrides update, and network packets override both).

2.5.3 Declaring Isolation Types:

When parallelizing the game example using the Concurrent Sharing Model, a total of 22 types were replaced with various "isolation types." Identifying all the shared fields was a matter of identifying the "model" state (the game vaguely follows a model-view-controller architecture). Note that the majority of fields and variables do not need to be versioned (for example, they may be read-only, or may never be accessed concurrently). Overall, the following isolation types were used, described in further detail in Section 2.6, as listed in the order of frequency:

VersionedValue $\langle T \rangle$, (13 instances). This was the most frequently used isolation type, and the type T ranged over all kinds of basic types including integers, floats, booleans, and enumerations.

VersionedObject $\langle T \rangle$, (5 instances). These were used for game objects such as photons, asteroids, particle effects, as well as for positions of objects.

CumulativeValue $\langle T \rangle$, (3 instances). 2 instances were used for sound flags (which are essentially a bitmask implementation of a set), and one was used for a message buffer that displays messages on the screen.

CumulativeList $\langle T \rangle$, (1 instance). This was used for the list of asteroids; new asteroids are added when old ones burst, which happens on collisions.

2.5.4 Deterministic Record and Replay:

At an abstract level, concurrent revisions do guarantee deterministic execution for correctly synchronized programs (that is, programs that join each revision they fork exactly once, and that do properly declare all shared data to have an isolation type).

In the parallelized loop (Table 4, right column) this guarantee does not hold completely, however, because it is queried whether the revision AutoSave has completed before joining it. Because timing varies between runs, this test does not always return the same result in each execution and thus introduces nondeterminism. This example showcases one dilemma: if it is desired to enforce complete determinism, then the program cannot dynamically adapt to unpredictable latency variations. Thus, there is a fundamental tension between determinism and responsiveness.

Clearly, there are in fact many sources of nondeterminism that quickly nullify deterministic execution even in the completely sequential version of the game. Examples include user input, network packet timing, and random number generators. Thus, rather than attempt to address "deterministic execution" of the game application, the Concurrent Sharing Model was used in this instance to provide a "deterministic record and replay" of the game. By recording and replaying all sources of nondeterminism it is possible to recover some of the benefits of determinism, such as a better debugging experience. Note that record/replay of revisions using the Concurrent Sharing Model is much easier than record/replay of conventional shared-memory programs because there are only a few ordering facts that need to be recorded.

2.6 Implementation Details for the Concurrent Sharing Model:

In general, the following paragraphs explain runtime implementation (via a C# library) and an optimized algorithm, which uses "lazy" copy-on-write, disposal of redundant replicas, and has a low overhead for accessing shared data for implementing various embodiments of the Concurrent Sharing Model. More specifically, the following paragraphs now describe various embodiments for implementing "revisions" and "isolation types." For clarifying the explanation of these ideas, the optimized algorithm is presented in a stripped-down version in pseudo object-oriented code, followed by a description of various extensions and optimizations that were used to implement the C# library.

2.6.1 The Optimized Algorithm:

Some of the basic considerations used to design and implement the optimized algorithm include:

It is useful for the (amortized) cost of a Get or Set operation on a versioned object to be very efficient, as these objects are called every time a revision accesses shared data.

To save time and space, it is useful to not copy data eagerly (such as on every fork), but lazily and only when necessary (that is, when the write may invalidate another revisions' snapshot). Note that this is an optional component that serves to improve overall efficiency of the Concurrent Sharing Model.

It is useful to release copies that are no longer needed as soon as possible in order to reduce both memory requirements and improve overall efficiency.

Table 5, presented below, provides a summarized overview (using pseudo-code) of the three classes used by the Concurrent Sharing Model, and how they relate. This information is presented more specifically in the following paragraphs. However, it must be understood that the specific objects names, and any names associated with any of those objects are not intended to limit the scope of the Concurrent Sharing Model, and that such objects and associated elements are named and described for purposes of explanation. Further, expanded details of these classes are provided below in Tables 6, 7, and 8, and Sections 2.6.2 through 2.6.6.

Revision objects represent revisions as defined earlier. Recall that in revision diagrams, revisions are the vertical lines, which consist of one or more line segments separated by forks or joins. Revision objects are created when a revision is forked, and released after a revision is joined. Each revision object has a current segment (the currently last segment of this revision) and a root segment (e.g., considering the revision diagrams described above, this is the line segment right above the fork that created this revision).

Segment objects correspond to vertical line segments in the revision diagrams, and are uniquely identified by their version number (i.e., the field version). Segment objects form a tree (by parent pointer). Segment objects are created when line segments are added to a revision diagram (each fork creates two new segments, each join creates one new segment), and are released when ref count reaches zero. Segment objects also maintain a list of all Versioned objects that were written to in this segment. Note that Versioned⟨T⟩ class derives from the Versioned class such that a homogenous list of non-generic versioned objects can be created.

Versioned objects contain a versions map that stores several (potentially changed) instances of shared data, indexed by version numbers. It stores for each line segment the last value written to this object in that segment, or a special value, denoted by the symbol "⊥", to signify that there was no write to this object in that segment.

versions [r.current.version] since only the last write is stored in this map. If the revision has not written to this particular object, the parent chain is followed to find the last write.

The Set method sets the current value for a revision. It first looks to see if the entry for the current segment is uninitialized. If so, it adds this versioned object to the written list of the segment, before writing the new value to the versions map.

Figure 11:
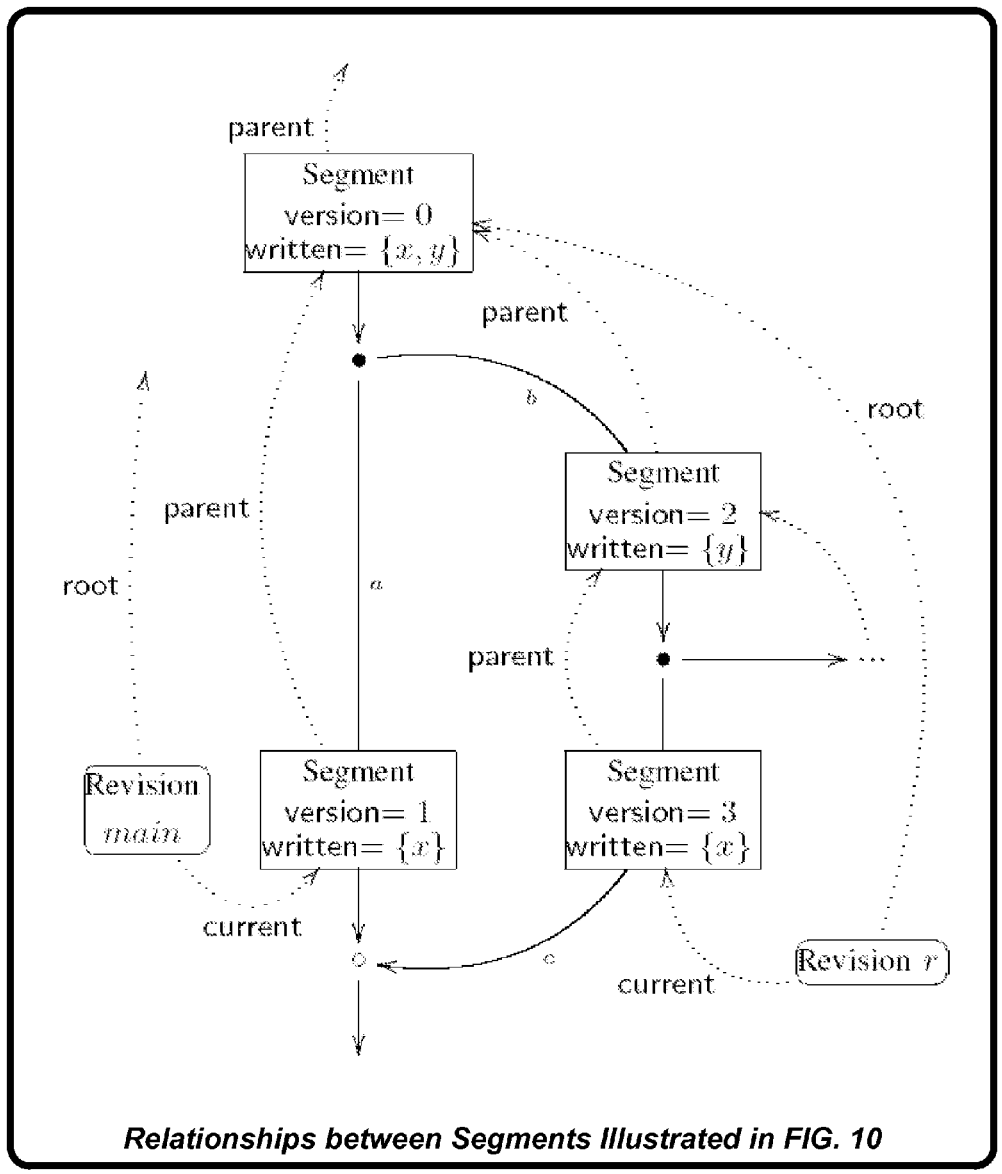
FIG. 11 provides an illustration of relationships between the segments illustrated in FIG. 10, as described herein.

2.6.3 Fork Operation:

The Fork operation (See Table 7, below) starts with creating a fresh revision r for the forked off branch. This is accomplished by first creating a new revision using the current segment as its root, and then creating a new current segment. For example, FIG. 11 illustrates the creation of segments with version numbers 1 and 2. After creating a new revision r, a new concurrent task is then created that assigns the new revision to the thread local currentRevision. Here it assumed that Task.StartNew starts a new concurrent task with the provided action delegate (anonymous function). Finally, the new revision r is returned such that it can be joined upon later. Note that as is well known to those skilled in the art, lightweight concurrent tasks based on work stealing are provided by .NET 4.0, while on other frameworks similar techniques can be used to start concurrent threads.

TABLE 5

Examples of Classes used by the Concurrent Sharing Model

| Revision Class | Segment Class | Versioned Object Class |
|---|---|---|
| class Revision {<br>  Segment root;<br>  Segment current;<br>  ...<br>} | class Segment {<br>  int version;<br>  int refcount;<br>  Segment parent;<br>  List⟨Versioned⟩ written;<br>  ...<br>} | class Versioned⟨T⟩ : Versioned {<br>  Map⟨int, T⟩ versions;<br>  ...<br>} |

Figure 10:
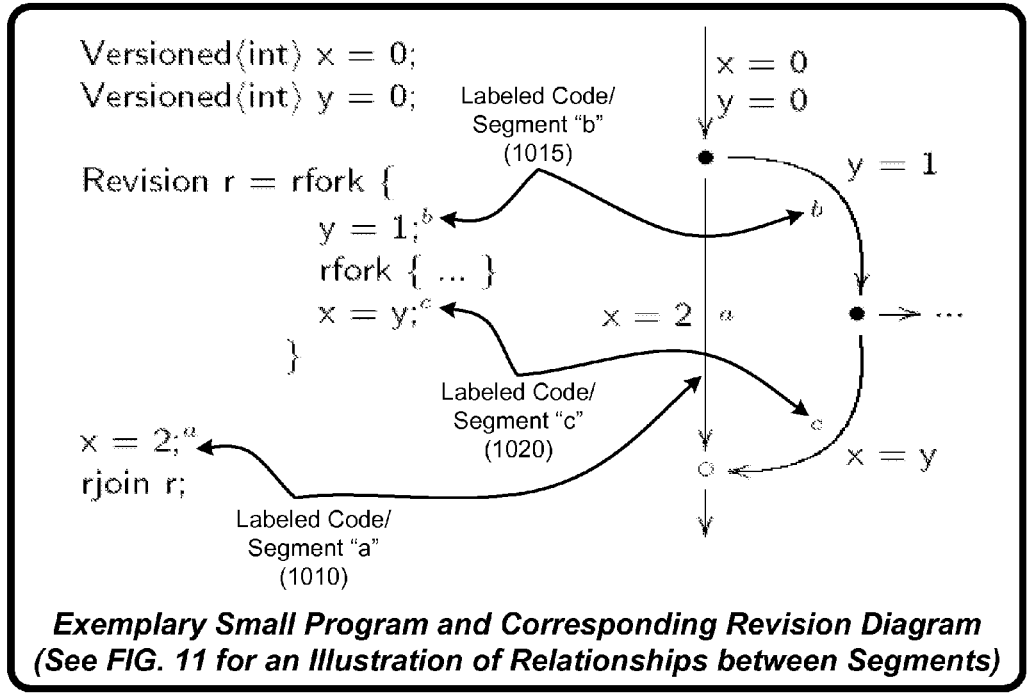
FIG. 10 illustrates an exemplary small program and a corresponding revision diagram having labeled segments, as described herein.

The next few subsections discuss several aspects of the implementation of the Concurrent Sharing Model in more detail. First though, a small example program and its revision diagram is illustrated by in FIG. 10, which will serve as a running illustration example for much of the following text. Note that some of the segments were labeled with "a", "b", and "c", (i.e., 1010, 1015, and 1020, respectively) and assume they will have version numbers "1", "2", and "3", respectively (as illustrated by FIG. 11). To explain the design of the algorithm, the state of the implementation before the rjoin r statement in FIG. 10 is discussed below. At that point, there are two Revision objects and five Segment objects, and they are related as shown in FIG. 11. At the concurrent point of time, the versions map for the variable x is {0↦0, 1↦2, 3↦1}, and the versions map for y is {0↦0, 2↦1}. As can be seen, only the last writes to a value are in the versions map; i.e., even though y is read in the c edge (as shown in FIG. 11), there is no entry for version 3 in the versions map of y.

2.6.2 Accessing Versioned Data:

To access versioned data, public Get and Set methods (see Table 6) are used. These methods consult a thread-local static field Revision.currentRevision (see Table 7) to automatically find the correct revision for the current thread.

The Get method then returns the current value associated with a particular revision. It cannot just return the content of

TABLE 6

Example of Versioned Class used by the Concurrent Sharing Model
Versioned Class

```
class Versioned {
    void Release( );
    void Collapse(Revision main, Segment parent);
    void Merge(Revision main, Revision joinRev, Segment join);
}
public class Versioned⟨T⟩ Versioned {
    Map⟨int, T⟩ versions; // map from version to value
    public T Get( ) return Get(Revision. currentRevision);}
    public void Set(T v) Set(Revision. currentRevision, v);}
    T Get(Revision r) {
        Segment s = r. current;
            while (versions[s. version] = ⊥) {   // Note " ⊥ "
                signifies no write to the object
                s = s. parent;
            }
            return versions[s. version];
    }
    void Set(Revision r, T value) {
        if (versions[r. current. version] = ⊥) {
            r. current. written. Add(this);
        }
        versions[r. current. version] = value;
    }
    void Release( Segment release ) {
        versions[release. version] = ⊥;
    }
    void Collapse( Revision main, Segment parent ) {
        if (versions[main. current. version] = ⊥) {
            Set(main, versions[parent. version]);
```

TABLE 6-continued

Example of Versioned Class used by the Concurrent Sharing Model
Versioned Class

```
        }
        versions[parent. version] = ⊥;
    }
    void Merge(Revision main, Revision joinRev, Segment join) {
        Segment s = joinRev. current;
        while (versions[s. version] = ⊥) {
            s = s. parent;
        }
        if (s = join) { // only merge if this was the last write
            Set(main, versions[join. version]);
        }
    }
}
// Note that the symbol "⊥" is used to signify that there is no write to a
particular object
```

TABLE 7

Example of Revision Class used by the Concurrent Sharing Model
Revision Class

```
public class Revision {
    Segment root;
    Segment current;
    Task task;
    Threadlocal static Revision curentRevision;
    Revision ( Segment root, Segment current) {
        this. root = root;
        this. current = current;
    }
    public Revision Fork (Action action) {
        Revision r;
        r = new Revision (current, new Segment (current));
        current. Release( ); // cannot bring refcount to zero
        current = new Segment(current);
        task = Task. StartNew( delegate ( ) {
            Revision previous = currentRevision;
            currentRevision = r;
            try { action( ); }
            finally { currentRevision = previous; }
        });
        return r;
    }
    public void Join(Revision join) {
        try {
            join. task. Wait( );
            Segment s = join. current;
            while (s ≠ join. root) {
                foreach (Versioned v in s. written) {
                    v. Merge(this, join, s);
                }
                s = s. parent;
            }
        }
        finally {
            join. current. Release( );
            current. Collapse(this);
        }
    }
}
```

TABLE 8

Example of Segment Class used by the Concurrent Sharing Model
Segment Class

```
class Segment {
    Segment parent;
    int version;
    int refcount;
    List⟨Versioned⟩ written;
    static int versionCount = 0;
```

TABLE 8-continued

Example of Segment Class used by the Concurrent Sharing Model
Segment Class

```
    Segment( Segment parent ) {
        this. parent = parent;
        if (parent ≠ null)parent. refcount + +;
        written = new List⟨Versioned⟩ ( );
        version = versionCount + +;
        refcount = 1;
    }
    void Release( ) {
        if (- - refcount = 0) {
            foreach (Versioned v in written) {
                v. Release (this);
            }
            if (parent ≠ null)parent. Release( );
        }
    }
    void Collapse( Revision main ) { // assert: main. current = this
        while (parent ≠ main. root∧ parent. refcount = 1) {
            foreach (Versioned v in parent. written) {
                v. Collapse(main, parent);
            }
            parent = parent. parent; // remove parent
        }
    }
}
```

2.6.4 Join Operation:

The Join operation (see Table 7, above) first waits until the associated concurrent task of the revision is done. Note that if an exception is raised in the concurrent task, it is re-raised in the call to Wait and in that case the Concurrent Sharing Model will not merge any changes. When Wait succeeds, the actual written objects in the join revision are merged.

In a while loop, the Concurrent Sharing Model visits each segment from join.current up to its root. For example, considering the example provided in FIG. 11, joining on r would visit the segments with versions 3 and 2. Indeed, together the written lists, those segments contain all objects that need to be merged back. For each segment, the Concurrent Sharing Model iterates over all written objects and calls their Versioned ⟨T⟩.Merge method with three arguments: the main revision, the joined revision, and the current segment. Looking at the implementation of that method in Table 6, it can be seen that it first finds the first segment that wrote to this object. Only if the merged segment join is the same will the Concurrent Sharing Model do a merge. If the merged segment is not equal, it means that that segment did not do the last write to that object and that the Concurrent Sharing Model will not merge older versions. If this happens to be the last write, the Concurrent Sharing Model merges by simply overwriting the value in the main revision (if it exists).

Finally, the Join function (see Table 7) releases the reference count on the joined revision, and calls Collapse on the current segment. These situations are described in detail below in Section 2.6.5 and Section 2.6.6.

2.6.5 Releasing Segments:

Each Segment object (See Table 8, above) maintains a refcount to keep track of how many parent and current fields are pointing at that segment (it does not count the root fields). The Release method is called by revisions to decrease the reference count, and whenever the reference count drops to zero, the Concurrent Sharing Model can release any objects referenced by this version since no tasks are still using the shared object at that time (i.e., when refcount=0).

Since only written objects are stored in the versions map of Versioned ⟨T⟩, the objects referenced by the version of the segment are simply those that are in its written list. The Release method calls the Versioned ⟨T⟩. Release method on each of the objects in its written list and then releases its parent segment. When looking at the Versioned ⟨T⟩. Release method in Table 6, it can be seen that it simply clears the entry for that object in the versions map. In the example provided in FIG. 11, the segment with version 3 will be released and the versions map of x will become {0↦0, 1↦1} after the join. Note that the map for y becomes {0↦0, 1↦1, 2↦1} since the segment for version 2 is not released as the inner forked revision could potentially still refer to that version of y.

2.6.6 Collapsing Segments:

The Collapse method (See Table 8) is only called on some current segment and it is the case that main.current=this when this method is called from Revision.join. The Collapse method tries to merge the parent segment into the current segment. In particular, when the Concurrent Sharing Model joins on some revision, the parent segment might have a reference count of 1, and no other segment is holding on to it. By collapsing with that segment, the Concurrent Sharing Model both reduces the chain of segments (which improves reads), but more importantly, it will also release older versions of objects that are never referenced again. Consequently, the Collapse operation ensures that the Concurrent Sharing Model does not leak memory over time.

Collapse visits the parent recursively while the reference count is 1. For each written object in the parent the Concurrent Sharing Model calls Versioned ⟨T⟩. Collapse on that object with the current revision and the parent segment. After visiting each written object, the Concurrent Sharing Model overwrites the parent field with the parent of the parent, effectively removing the parent segment (which is now collapsed into the current revision). The implementation of Versioned ⟨T⟩. Collapse can be seen in Table 6. If the current revision has not written this object yet, the Concurrent Sharing Model sets it to the value of the parent revision. Finally, the parent version is cleared, thereby releasing its reference.

2.6.7 Additional Isolation Types:

The optimized algorithm introduced above includes the single isolation type referred to as "Versioned ⟨T⟩". This type is actually called VersionedValue ⟨T⟩ in the aforementioned C# library, which contains a variety of isolation types. For example, the type CumulativeValue⟨T⟩ enables users to specify a specific merge function. This merge function needs to know the original snapshot value, which the Concurrent Sharing Model can access by following the Revision.root pointer of the revision being joined.

Figure 9:
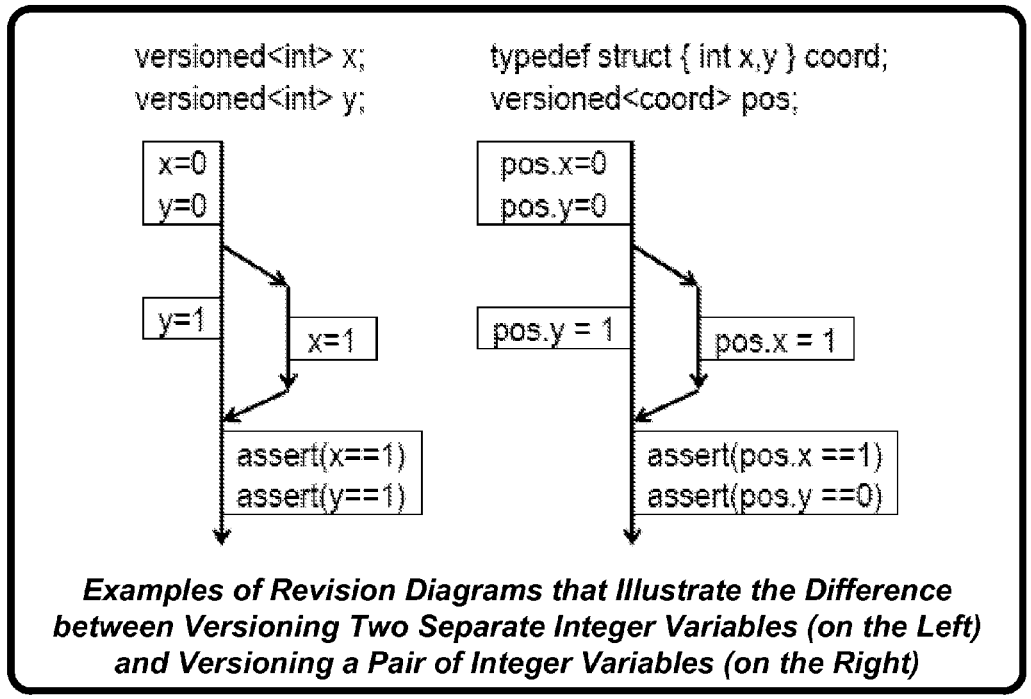
FIG. 9 provides an example of a pair of revision diagrams that illustrate the difference between "versioning" two separate integer variables, and "versioning" a pair of integer variables, as described herein.

For reference values, the Concurrent Sharing Model implements VersionedObject ⟨T⟩ and CumulativeObject ⟨T⟩, which version all fields of an object as a whole (see to FIG. 9, for example). To access such objects, Get and Set are not appropriate, but similar operations can be used:

T GetForRead( Revision r ); and
T GetForWrite( Revision r );

where GetForRead is used to get a read-only reference to an object, and GetForWrite is used to get a mutable version of the object. Advantageously, if natively supported by a particular programming language, the use of these operations could be hidden and inserted automatically by the compiler.

Beyond those isolation types, the aforementioned C# library also supports the cumulative collection classes CumulativeList ⟨T⟩ and CumulativeSet ⟨T⟩ with their natural merge functions, and a VersionedRandom class that serves as a deterministic pseudorandom generator.

2.7 Optimization:

The Concurrent Sharing Model can be optimized in several optional ways. Several of these optimizations, which can be used in combination, of desired, are described below.

For example, in one embodiment, the Concurrent Sharing Model uses a specialized mostly lock-free implementation for the versions map. This embodiment uses arrays that may be resized if necessary (since, as discussed above, only the last writes to a value are in the versions map, and thus, there may be no entry for a particular version. As such, the actual size of the versions map may vary. Consequently, using resizable arrays can further reduce memory utilization.

In another embodiment, to further speed up the Get operation, the Concurrent Sharing Model maintains a cache that contains the version and corresponding index of the last read or write to the corresponding object. In a tested embodiment, this index was implemented as a 32 bit word that contains a version number in the lower 16 bits, and an index in the upper 16 bits. By keeping it the size of a word, the Concurrent Sharing Model can atomically read and write this cache without using locks. However, it should be appreciated that the Concurrent Sharing Model is not limited to using 32 bit words size indices, and that this particular implementation is provided only for purposes of explanation, and as one possible embodiment for speeding up the Get operation.

In yet another embodiment, when forking a new revision, the Concurrent Sharing Model first checks whether the current segment contains any writes. If not, the Concurrent Sharing Model can stay the current segment, and use its parent as the parent of the new segment, thereby simplifying or reducing the number of joins to be considered.

When merging objects, the Concurrent Sharing Model can distinguish many special cases that can be handled a bit faster. For example, in an optimized implementation of the Concurrent Sharing Model, the Versioned ⟨T⟩. Merge is the most complicated part, consisting of eight separate cases. Partly the complexity is due to the application of merge functions for cumulative objects, and partly because the Concurrent Sharing Model releases slots directly during the merge and tries to reuse and update slots in-place whenever possible.

Figure 12:
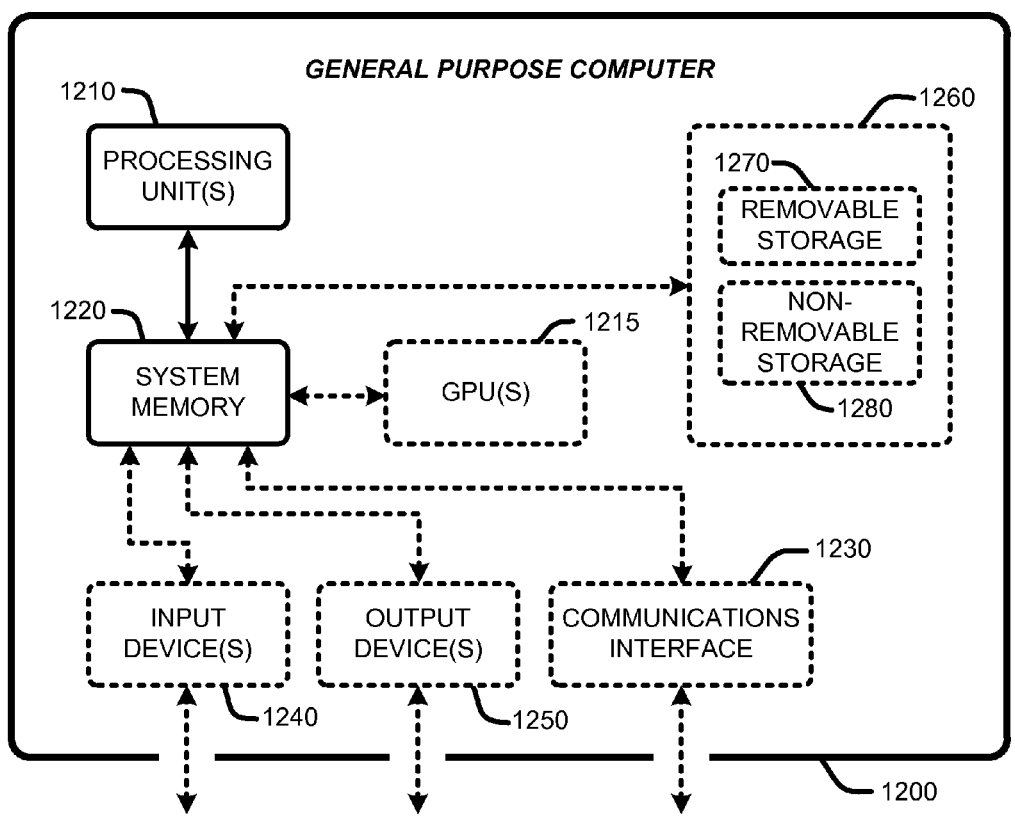
FIG. 12 is a general system diagram depicting a simplified general-purpose computing device having simplified computing and I/O capabilities for use in implementing various embodiments of the Concurrent Sharing Model, as described herein.

3.0 Exemplary Operating Environments:

The Concurrent Sharing Model described herein is operational within numerous types of general purpose or special purpose computing system environments or configurations. FIG. 12 illustrates a simplified example of a general-purpose computer system on which various embodiments and elements of the Concurrent Sharing Model, as described herein, may be implemented. It should be noted that any boxes that are represented by broken or dashed lines in FIG. 12 represent alternate embodiments of the simplified computing device, and that any or all of these alternate embodiments, as described below, may be used in combination with other alternate embodiments that are described throughout this document.

For example, FIG. 12 shows a general system diagram showing a simplified computing device 1200. Such computing devices can be typically be found in devices having at least some minimum computational capability, including, but not limited to, personal computers, server computers, handheld computing devices, laptop or mobile computers, communications devices such as cell phones and PDA's, multi-processor systems, microprocessor-based systems, set top boxes, programmable consumer electronics, network PCs, minicomputers, mainframe computers, audio or video media players, etc.

To allow a device to implement the Concurrent Sharing Model, the device should have a sufficient computational capability and system memory to enable basic computational operations. In particular, as illustrated by FIG. 12, the computational capability is generally illustrated by one or more processing unit(s) 1210, and may also include one or more GPUs 1215, either or both in communication with system memory 1220. Note that that the processing unit(s) 1210 of the general computing device of may be specialized microprocessors, such as a DSP, a VLIW, or other micro-controller, or can be conventional CPUs having one or more processing cores, including specialized GPU-based cores in a multi-core CPU.

In addition, the simplified computing device of FIG. 12 may also include other components, such as, for example, a communications interface 1230. The simplified computing device of FIG. 12 may also include one or more conventional computer input devices 1240. The simplified computing device of FIG. 12 may also include other optional components, such as, for example, one or more conventional computer output devices 1250. Note that typical communications interfaces 1230, input devices 1240, output devices 1250, and storage devices 1260 for general-purpose computers are well known to those skilled in the art, and will not be described in detail herein.

The simplified computing device of FIG. 12 may also include volatile or non-volatile storage devices 1260 that are either removable 1270 and/or non-removable 1280, for storage of information such as computer-readable or computer-executable instructions, data structures, program modules, or other data. Such storage includes, but is not limited to, computer or machine readable media or storage devices such as DVD's, CD's, floppy disks, tape drives, hard drives, optical drives, solid state memory devices, RAM, ROM, EEPROM, flash memory or other memory technology, magnetic cassettes, magnetic tapes, magnetic disk storage, or other magnetic storage devices, or any other device which can be used to store the desired information and which can be accessed by one or more computing devices.

Storage of information such as computer-readable or computer-executable instructions, data structures, program modules, etc., can also be accomplished by using any of a variety of communication media to encode one or more modulated data signals or carrier waves, or other transport mechanisms or communications protocols, and includes any wired or wireless information delivery mechanism. Note that the terms "modulated data signal" or "carrier wave" generally refer a signal that has one or more of its characteristics set or changed in such a manner as to encode information in the signal. For example, communication media includes wired media such as a wired network or direct-wired connection carrying one or more modulated data signals, and wireless media such as acoustic, RF, infrared, laser, and other wireless media for transmitting and/or receiving one or more modulated data signals or carrier waves. Combinations of the any of the above should also be included within the scope of communication media.

Further, software, programs, and/or computer program products embodying the some or all of the various embodiments of the Concurrent Sharing Model described herein, or portions thereof, may be stored, received, transmitted, or read from any desired combination of computer or machine readable media or storage devices and communication media in the form of computer executable instructions or other data structures.

Finally, the Concurrent Sharing Model described herein may be further described in the general context of computer-executable instructions, such as program modules, being executed by a computing device. Generally, program modules include routines, programs, objects, components, data structures, etc., that perform particular tasks or implement particular abstract data types. The embodiments described herein may also be practiced in distributed computing environments where tasks are performed by one or more remote processing devices, or within a cloud of one or more devices, that are linked through one or more communications networks. In a distributed computing environment, program modules may be located in both local and remote computer storage media including media storage devices. Still further, the aforementioned instructions may be implemented, in part or in whole, as hardware logic circuits, which may or may not include a processor.

The foregoing description of the Concurrent Sharing Model has been presented for the purposes of illustration and description. It is not intended to be exhaustive or to limit the claimed subject matter to the precise form disclosed. Many modifications and variations are possible in light of the above teaching. Further, it should be noted that any or all of the aforementioned alternate embodiments may be used in any combination desired to form additional hybrid embodiments of the Concurrent Sharing Model. It is intended that the scope of the invention be limited not by this detailed description, but rather by the claims appended hereto.

What is claimed is:

1. A method for ensuring determinacy in states of concurrently shared variables in an application, comprising steps for:
    using an isolation type from a set of one or more isolation types to declare which variables in the application are to be shared by two or more concurrent tasks of the application;
    wherein the isolation types include a category of one or more versioned types and a category of one or more cumulative types;
    wherein each isolation type includes a pre-defined deterministic conflict resolution policy for addressing write-write conflicts between two or more of the concurrent tasks;
    using a fork-join model to specify concurrent execution of the concurrent tasks;
    providing a runtime system of the application that, during execution of the application, automatically conceptually replicates the shared declared variables by providing a private local copy of the shared declared variables for each concurrent task on fork and merges them back together on join, so that each task can work with an independent copy of shared declared variables; and
    wherein merging the shared declared variables back together on join further comprises steps for evaluating the pre-defined deterministic conflict resolution policy of the isolation type of each shared declared variable to determine which of one or more concurrent tasks will be used to perform the merge of each said shared declared variable.

2. The method of claim 1 wherein automatically conceptually replicating the shared declared variables on fork further comprises steps for providing the private local copy of the shared declared variables for each concurrent task only when each of those tasks is to perform a write operation for the shared declared variable.

3. The method of claim 1 wherein the versioned types of the shared declared variables are merged by first checking whether a value of the shared declared variable has been modified after being forked, and wherein:
   if that value has not been modified, completing the merge without updating the shared declared variable; and
   if that value has been modified, completing the merge by changing the current value of the shared declared variable of the task that is performing the join to the current value of the shared declared variable of the task that is being joined.

4. The method of claim 1 wherein the cumulative types of the shared declared variables are merged by:
   determining a combined effect of modifications to the shared declared variable by one or more tasks by combining the shared declared variable from each concurrent task using a general merge function that returns a result value for updating the shared declared variable based on a set of arguments.

5. The method of claim 4 wherein the set of arguments includes an original value (i.e., the value of the shared declared variable at a time when the task was forked), a master value (i.e., a current value in the task that performs the join), and a revised value (i.e., a current value in the task that is being joined).

6. The method of claim 1 further comprising applying the pre-defined deterministic conflict resolution policy of the isolation type of each shared declared variable to determine a priority of each concurrent task.

7. The method of claim 6 further comprising terminating one or more of the concurrent tasks that have not completed when one or more higher priority concurrent tasks have completed.

8. A system for providing determinacy in states of concurrently shared variables, comprising:
   one or more computing devices for:
   for each set of two or more shared variables, specifying an isolation type from a set of one or more isolation types to declare which variables in an application are to be shared by two or more concurrent tasks of the application;
   wherein the set of one or more isolation types include a category of one or more versioned types and a category of one or more cumulative types;
   wherein each isolation type includes a pre-defined deterministic conflict resolution policy for addressing write-write conflicts between two or more of the concurrent tasks;
   specifying concurrent execution of the concurrent tasks via a fork-join model;
   providing a runtime system of the application that, during execution of the application, automatically conceptually replicates the shared declared variables by providing a private local copy of the shared declared variables for each concurrent task on fork and merges them back together on join, so that each task can work with an independent copy of shared declared variables; and
   evaluating the pre-defined deterministic conflict resolution policy of the isolation type of each shared declared variable to determine which of one or more concurrent tasks will be used to perform the merge of each shared declared variable on join.

9. The system of claim 8 wherein automatically conceptually replicating the shared declared variables on fork comprises providing a private local copy of the shared declared variables for each concurrent task only when each of those tasks is to perform a write operation for the shared declared variable.

10. The system of claim 8 wherein versioned types of the shared declared variables are merged by first checking whether a value of the shared declared variable has been modified after being forked, and wherein:
    if that value has not been modified, completing the merge without updating the shared declared variable; and
    if that value has been modified, completing the merge by changing the current value of the task that is performing the join to the current value of the task that is being joined.

11. The system of claim 8 wherein cumulative types of the shared declared variables are merged by:
    determining a combined effect of modifications to the shared declared variable by one or more tasks by combining the shared declared variable from each concurrent task using a general merge function that returns a result value for updating the shared declared variable based on a set of arguments.

12. The system of claim 11 wherein the set of arguments includes an original value (i.e., the value of the shared declared variable at a time when the revision was forked), a master value (i.e., a current value in the task that performs the join), and a revised value (i.e., a current value in the revision that is being joined).

13. The system of claim 8 further comprising applying the pre-defined deterministic conflict resolution policy of the isolation type of each shared declared variable to determine a priority of each concurrent task.

14. The system of claim 13 further comprising terminating one or more of the concurrent tasks that have not completed when one or more higher priority concurrent tasks have completed.

15. A computer memory having computer executable instructions stored thereon for constructing applications having ensured determinacy in states of concurrently shared objects, said instructions comprising:
    using one or more computing devices for:
    for each set of two or more shared objects, specifying an isolation type from a set of one or more isolation types to declare which objects in an application are to be shared by two or more concurrent tasks of the application;
    wherein the set of one or more isolation types include a category of one or more versioned types and a category of one or more cumulative types;
    wherein each isolation type includes a pre-defined deterministic conflict resolution policy for addressing write-write conflicts between two or more of the concurrent tasks;
    specifying concurrent execution of the concurrent tasks via a fork-join model;
    providing a runtime system of the application that, during execution of the application, automatically conceptually replicates the shared declared objects by providing a private local copy of the shared declared objects for each concurrent task on fork and merges them back together on join, so that each task can work with an independent copy of shared declared objects; and
    evaluating the pre-defined deterministic conflict resolution policy of the isolation type of each shared declared object to determine which of one or more concurrent tasks will be used to perform the merge of each shared declared object on join.

16. The computer memory of claim 15 wherein automatically conceptually replicating the shared declared objects on fork comprises providing a private local copy of the shared declared objects for each concurrent task only when each of those tasks is to perform a write operation for the shared declared object.

17. The computer memory of claim 15 wherein versioned types of the shared declared objects are merged by first checking whether a value of the shared declared object has been modified after being forked, and wherein:
   if that value has not been modified, completing the merge without updating the shared declared object; and
   if that value has been modified, completing the merge by changing the current value of the task that is performing the join to the current value of the task that is being joined.

18. The computer memory of claim 15 wherein cumulative types of the shared declared objects are merged by:
   determining a combined effect of modifications to the shared declared object by one or more tasks by combining the shared declared object from each concurrent task using a general merge function that returns a result value for updating the shared declared object based on a set of arguments.

19. The computer memory of claim 18 wherein the set of arguments includes an original value (i.e., the value of the shared declared object at a time when the revision was forked), a master value (i.e., a current value in the task that performs the join), and a revised value (i.e., a current value in the revision that is being joined).

20. The computer memory of claim 15 further comprising:
   applying the pre-defined deterministic conflict resolution policy of the isolation type of each shared object to determine a priority of each concurrent task; and
   terminating one or more of the concurrent tasks that have not completed when one or more higher priority concurrent tasks have completed.

* * * * *